(12) United States Patent
Godsey

(10) Patent No.: US 10,121,184 B2
(45) Date of Patent: Nov. 6, 2018

(54) SLIDE CHECKOUT

(71) Applicant: PayPal, Inc., San Jose, CA (US)

(72) Inventor: Sandra Lynn Godsey, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 149 days.

(21) Appl. No.: 13/722,580

(22) Filed: Dec. 20, 2012

(65) Prior Publication Data

US 2014/0180880 A1 Jun. 26, 2014

(51) Int. Cl.
*G06Q 30/06* (2012.01)

(52) U.S. Cl.
CPC ................ *G06Q 30/0641* (2013.01)

(58) Field of Classification Search
None
See application file for complete search history.

(56) References Cited

U.S. PATENT DOCUMENTS

| | | | | |
|---|---|---|---|---|
| 5,764,873 | A * | 6/1998 | Magid | G06F 3/0486 715/769 |
| 7,921,052 | B2 * | 4/2011 | Dabney et al. | 705/37 |
| 8,150,736 | B2 * | 4/2012 | Horn et al. | 705/26.1 |
| 8,364,590 | B1 * | 1/2013 | Casey et al. | 705/39 |
| 8,600,892 | B2 * | 12/2013 | Foster et al. | 705/44 |
| 2002/0116276 | A1 * | 8/2002 | Ottley | 705/26 |
| 2003/0023514 | A1 * | 1/2003 | Adler et al. | 705/27 |
| 2005/0166159 | A1 * | 7/2005 | Mondry | G06F 3/0486 715/769 |
| 2009/0150262 | A1 * | 6/2009 | Mizhen | 705/27 |
| 2010/0153265 | A1 * | 6/2010 | Hershfield et al. | 705/40 |
| 2010/0153888 | A1 * | 6/2010 | Jarosz | G06F 3/04812 715/856 |
| 2010/0250398 | A1 * | 9/2010 | Susilo | G06Q 30/02 705/26.1 |
| 2012/0310760 | A1 * | 12/2012 | Phillips et al. | 705/26.1 |

OTHER PUBLICATIONS

Weinmann et al. "Step-by-Step: Using Bridge in Photoshop CS3" Jul 20, 2007 http://www.peachpit.com/articles/article.aspx?p=773682&seqNum=9.*

* cited by examiner

*Primary Examiner* — Kathleen Palavecino
*Assistant Examiner* — Lance Y Cai
(74) *Attorney, Agent, or Firm* — Maschoff Brennan

(57) ABSTRACT

A system and method of presenting selectable checkout options for an item listing on a single page. A single page for an item listing is caused to be displayed on a device. The single page comprises a selectable item identifier for an item and a plurality of selectable checkout options for the item. The plurality of selectable checkout options comprises different types of selectable checkout options. An indication of a selection of the item identifier and an indication of a selection of one of the selectable checkout options are received. A visual representation of the selection of the selectable item identifier and a visual representation of the selection of one of the selectable checkout options are causes to be displayed on the single page. A visual representation for each of the selected checkout options are displayed as being attached to the visual representation of the selected item identifier.

12 Claims, 23 Drawing Sheets

SLIDE CHECKOUT

TECHNICAL FIELD

The present application relates generally to the technical field of electronic commerce (e-commerce), and, in various embodiments, to systems and methods of presenting selectable checkout options for an item listing on a single page on a device.

BACKGROUND

In order to make all of the necessary selections for completing a purchase of an item, a user must navigate through multiple pages of a checkout process. This multi-page checkout process can be inconvenient for the user, especially when using a mobile device. As a result, the user may abandon the checkout process before it is completed. Additionally, the bandwidth requirements for mobile transactions may incur additional costs to the user, as well as delays. In some situations, these transactions cause the mobile device to freeze while awaiting communications, instructions, or other information. This causes an undesirable experience for the user, burdens the wireless network (s), and results in lost transaction costs for the merchant.

BRIEF DESCRIPTION OF THE DRAWINGS

Some embodiments of the present disclosure are illustrated by way of example and not limitation in the figures of the accompanying drawings, in which like reference numbers indicate similar elements and in which:

FIGS. 3A-3I illustrate different stages of a checkout process for a computing device where selectable checkout options are presented on a single page on a device, according to some embodiments;

DETAILED DESCRIPTION

Figure 1:
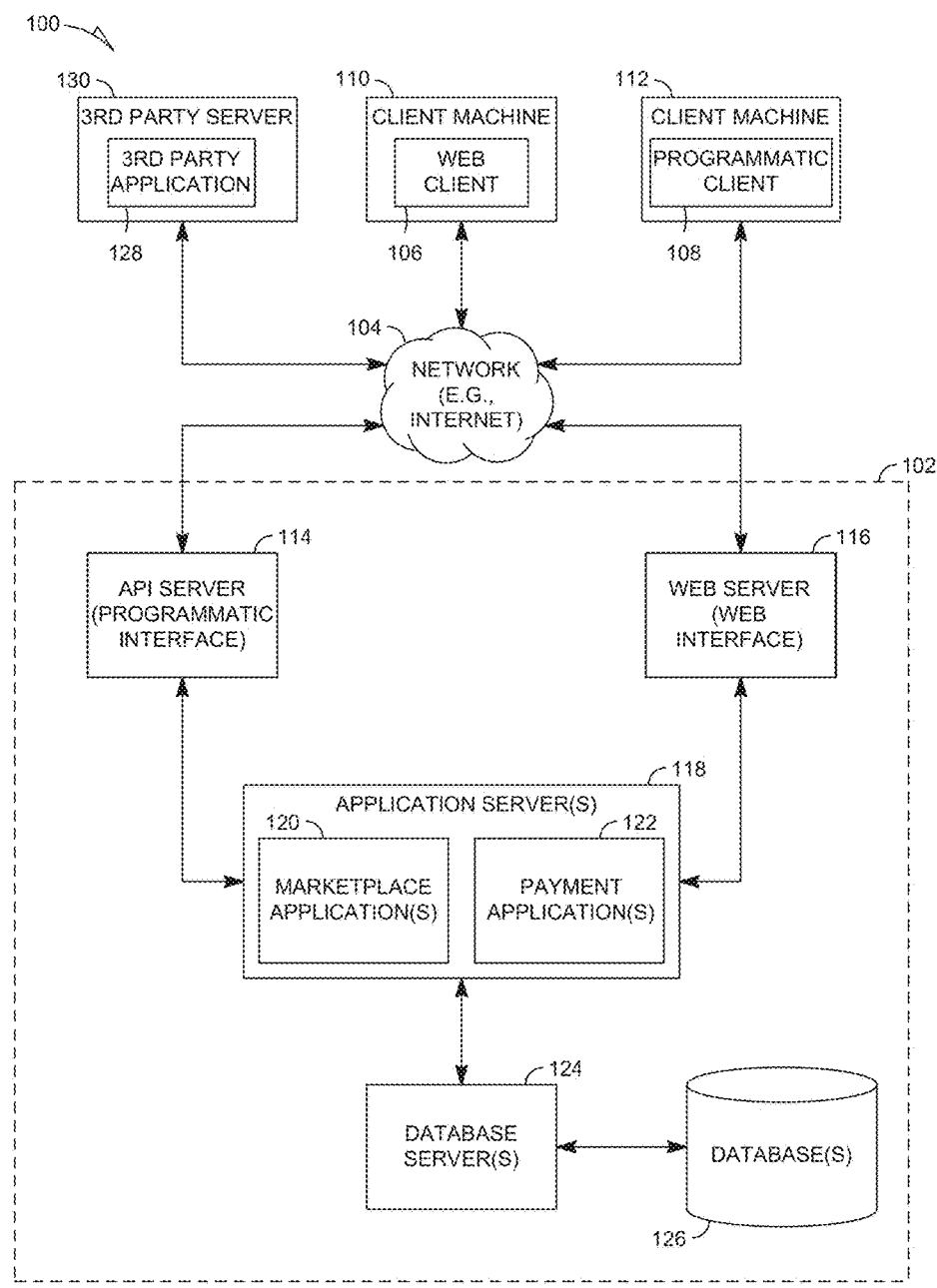
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes systems and methods of presenting selectable checkout options on a single page on a computing device, such as a personal computer, a notebook device, a laptop computer, a mobile phone, any of a variety of wireless or otherwise mobile device, a point of sale device, and so forth. The present disclosure is also applicable to mobile devices with limited graphic capability and may be implemented as text messages or via a short messaging service (SMS). Still further, these systems and methods may be implemented on a television or broadcasting device to facilitate smooth, efficient transactions. The term computing device is meant to include any device which receives, computes or processes instructions, and is not limited to any specific type of device. The present disclosure is applicable to any device which connects two users in a transaction.

Presenting the selectable checkout options on the single page spares the user the lengthy process of navigating through each checkout option one page at a time and increases the likelihood that the user will complete a purchase. Further, where the display of the device is a screen presented to the user, such as at a point of sale device, the checkout option allows the user to avoid screen refresh or otherwise navigating multiple screens or display instances.

In some embodiments, a system may comprise at least one processor and a checkout option display module. The checkout option display module may be executable by the at least one processor. The checkout option display module may be configured to cause to be displayed, on a device, a single page for an item listing. The single page may comprise a selectable item identifier for an item and a plurality of selectable checkout options for the item. The plurality of selectable checkout options may comprise different types of selectable checkout options. The checkout option display module may also be configured to receive an indication of a selection of the item identifier and an indication of a selection of one of the selectable checkout options, and to cause to be displayed, on the single page, a visual representation of the selection of the selectable item identifier and a visual representation of the selection of one of the selectable checkout options.

In some embodiments, the selectable checkout options for the item may comprise at least one selectable payment instrument option, at least one selectable billing address option, and at least one selectable shipping address option. In some embodiments, the visual representation of the selection of the selectable item identifier may comprise an icon of the selected item identifier and the visual representation of the selection of one of the selectable checkout options may comprise an icon of the selected checkout option. In some embodiments, the checkout option display module may be further configured to cause to be displayed, on the single page, movement of the visual representation of the selection of the selectable item identifier and movement of the visual representation of the selection of one of the selectable checkout options in response to user input. In some embodiments, the checkout option display module may be further configured to cause a visual representation for each of the selectable checkout options that are selected to be displayed on the single page as being attached to the visual representation of the selection of the selectable item identifier. In some embodiments, movement of the visual representation of the selection of the selectable item identifier may be matched by a corresponding movement of the visual representation for each of the selectable checkout options that are selected. In some embodiments, the checkout option display module may be further configured to cause at least one of the selectable checkout options to be unavailable for selection in response to a different one of the selectable checkout options being selected. In some embodiments, the different one of the selectable checkout options may be of a different type than the at least one of the selectable checkout options being caused to be unavailable for selection. In some embodiments, the checkout option display module may be further configured to generate the single page using checkout options presented over multiple web pages of a checkout process for an item listing. In some embodiments, each one of the checkout options presented over the multiple web pages may be used to generate a corresponding one of the selectable checkout options.

In some embodiments, a computer-implemented method may comprise causing to be displayed, on a device, a single page for an item listing. The single page may comprise a selectable item identifier for an item and a plurality of selectable checkout options for the item. The plurality of selectable checkout options may comprise different types of selectable checkout options. An indication of a selection of the item identifier and an indication of a selection of one of the selectable checkout options may be received. A visual representation of the selection of the selectable item identifier and a visual representation of the selection of one of the selectable checkout options may be caused to be displayed on the single page. In some embodiments, the selectable checkout options for the item may comprise at least one selectable payment instrument option, at least one selectable billing address option, and at least one selectable shipping address option.

In some embodiments, the shipping address option may display a photo or other graphic image associated with a recipient. This image may be received or associated with a social network, an address book of the user, or other network information. For example, in a transaction to purchase a gift for a user's sister, the user may select the shipping information by selecting a photo of the user's sister from a social network site. In a business application, the shipping destination or recipient may be a logo of a business.

In some embodiments, the visual representation of the selection of the selectable item identifier may comprise an icon of the selected item identifier and the visual representation of the selection of one of the selectable checkout options may comprise an icon of the selected checkout option. In some embodiments, movement of the visual representation of the selection of the selectable item identifier and movement of the visual representation of the selection of one of the selectable checkout options may be caused to be displayed on the single page in response to user input. In some embodiments, a visual representation for each of the selectable checkout options that are selected may be caused to be displayed on the single page as being attached to the visual representation of the selection of the selectable item identifier. In some embodiments, movement of the visual representation of the selection of the selectable item identifier may be matched by a corresponding movement of the visual representation for each of the selectable checkout options that are selected. In some embodiments, at least one of the selectable checkout options may be caused to be unavailable for selection in response to a different one of the selectable checkout options being selected. In some embodiments, the different one of the selectable checkout options may be of a different type than the at least one of the selectable checkout options being caused to be unavailable for selection. In some embodiments, the single page may be generated using checkout options presented over multiple web pages of a checkout process for an item listing. In some embodiments, each one of the checkout options presented over the multiple web pages may be used to generate a corresponding one of the selectable checkout options.

In some embodiments, a non-transitory machine-readable storage device may store a set of instructions that, when executed by at least one processor, causes the at least one processor to perform operations comprising causing a single page for an item listing to be displayed. The single page may comprise a selectable item identifier for an item and a plurality of selectable checkout options for the item. The plurality of selectable checkout options may comprise different types of selectable checkout options. An indication of a selection of the item identifier and an indication of a selection of one of the selectable checkout options may be received. A visual representation of the selection of the selectable item identifier and a visual representation of the selection of one of the selectable checkout options may be caused to be displayed on the single page.

In some embodiments, the selectable checkout options for the item may comprise at least one selectable payment instrument option, at least one selectable billing address option, and at least one selectable shipping address option. In some embodiments, the visual representation of the selection of the selectable item identifier may comprise an icon of the selected item identifier and the visual representation of the selection of one of the selectable checkout options may comprise an icon of the selected checkout option. In some embodiments, the operations may further comprise causing to be displayed, on the single page, movement of the visual representation of the selection of the selectable item identifier and movement of the visual representation of the selection of one of the selectable checkout options in response to user input. In some embodiments, the operations may further comprise causing a visual representation for each of the selectable checkout options that are selected to be displayed on the single page as being attached to the visual representation of the selection of the selectable item identifier. In some embodiments, movement of the visual representation of the selection of the selectable item identifier may be matched by a corresponding movement of the visual representation for each of the selectable checkout options that are selected. In some embodiments, the operations may further comprise causing at least one of the selectable checkout options to be unavailable for selection in response to a different one of the selectable checkout options being selected. In some embodiments, the different one of the selectable checkout options may be of a different type than the at least one of the selectable checkout options being caused to be unavailable for selection. In some embodiments, the operations may further comprise generating the single page using checkout options presented over multiple web pages of a checkout process for an item listing. In some embodiments, each one of the checkout options presented over the multiple web pages may be used to generate a corresponding one of the selectable checkout options.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
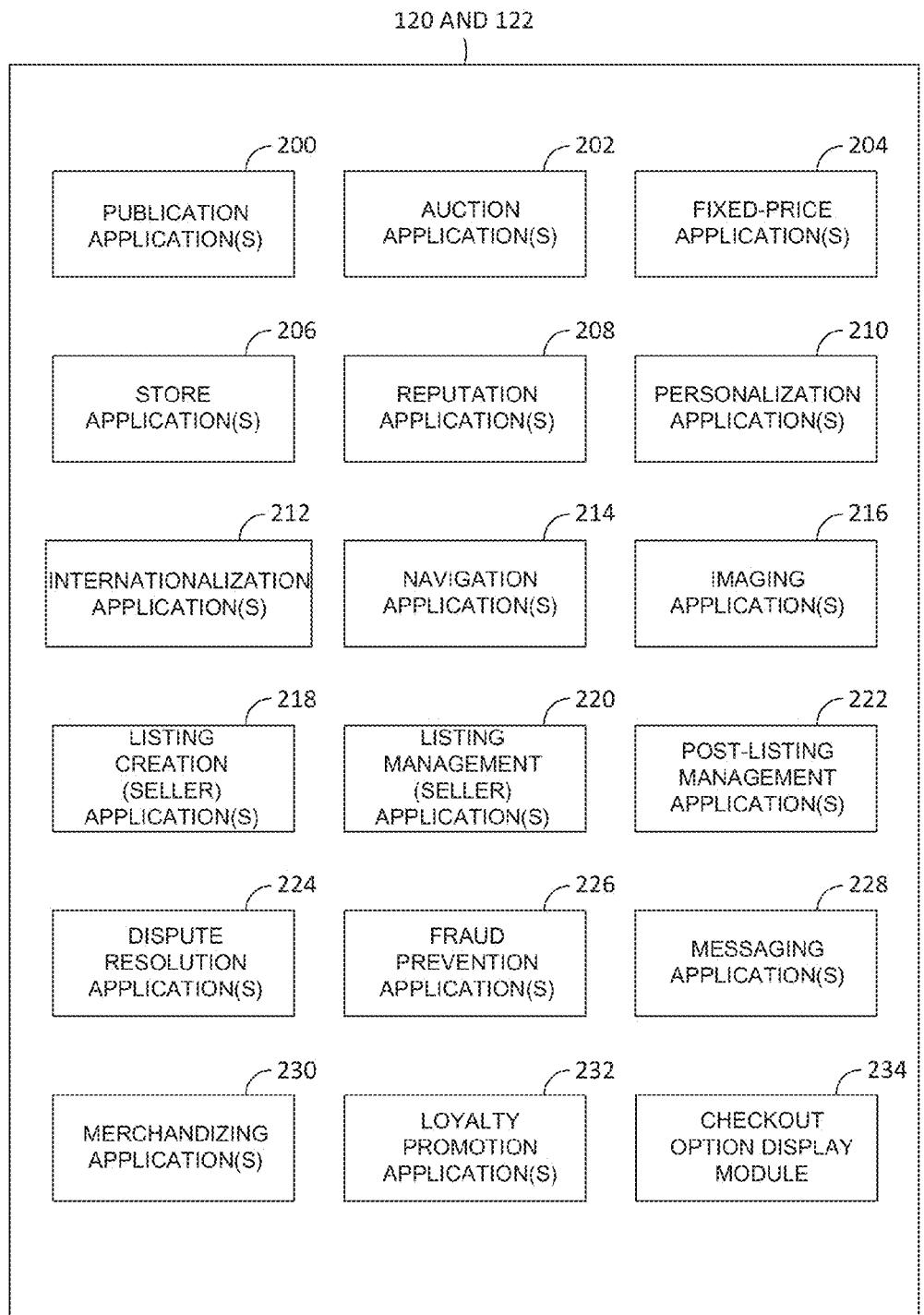
FIG. 2 is a block diagram depicting a various components of a network-based publisher, according to some embodiments.

FIG. 2 is a block diagram illustrating multiple marketplace and payment applications 120 and 122 that, in one example embodiment, are provided as part of the networked system 102. Alternate solutions may include other combinations of these modules. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may, furthermore, access one or more databases 126 via the database servers 124. The slide checkout mechanism disclosed herein may be integrated with any or all of the applications described hereinbelow. Some examples of such integration are provided; however, other applications may also have integrations consistent with this disclosure.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller. The store applications 206 may support an online webstore, such as a hosted solution, where the webstore integrates with the slide checkout mechanism to enable users to easily use the webstore application on a mobile device, wherein the item and item identifier are provided by the store. According to some embodiments, the slide checkout cursor is configured according to input from the store, such as where the cursor is designed and presented to the user having the look and feel of the store. Further, the organization of the information presented to the user may be specific to the store.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties. The personalization application(s) 210 may integrate with the slide checkout mechanism such that the user's information is used to generate the selections and options available. In some embodiments, the user is able to specify their preferences, such as incorporate specific payment options, addresses and other considerations. For example, the user may specify that when a particular shipping address is selected, then a selection to identify the item as a gift will be presented on the display; when the user slides over the gift option, a gift receipt is provided with the item, or a gift card is provided with the item.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116. The internationalization applications 212 may integrate with the slide checkout mechanism to provide specific configurations for a geographical area. For example, in Japan, the display may provide the various selection items from right to left, consistent with the reading order for Japanese consumers.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

A checkout option display module 234 may be configured to enable different types of selectable checkout options of a checkout process for an item to be presented together on a single page, rather than the different types of checkout options being presented on separate pages. In some embodiments, the checkout option display module 234 may be configured to cause all the checkout options required for completion of a checkout process for an item (e.g., options for a payment instrument, a billing address, and a shipping address) to be displayed on the single page. The checkout option display module 234 may be configured to cause a single page for an item listing to be displayed on a device. In some embodiments, the device is a mobile device (e.g., a cell phone). However, it is contemplated that other devices are also within the scope of the present disclosure.

The checkout options may be configured to enable a quick checkout which auto-populates options for the user, wherein the checkout option display identifies a specific payment method, billing address, shipping address, other information, or a combination thereof as a single identifier. There may be multiple checkout configurations presented to the user, each including multiple selections in a preselected manner for the user. Examples include a digital wallet option, wherein selection of the digital wallet option applies the priority of payment options set in the digital wallet. In this example, the user may have a priority scheme in the wallet to use a first payment instrument or service for purchases under a given purchase amount, and a second payment instrument or service for purchases over that purchase amount. Similarly, the user may indicate a given payment instrument or service for internet purchases and another payment instrument or service for local purchases. A variety of checkout options may be implemented by the user.

The single page may comprise a selectable item identifier for an item of the item listing and a plurality of selectable checkout options for the item. The selectable item identifier may comprise any visual representation of the item (e.g., an image of the item, a title or name for the item, etc.). The selectable item identifier may comprise an image, text, an image of text, or a combination of an image and text.

The plurality of selectable checkout options may comprise different types of selectable checkout options. One type of selectable checkout option may be a selectable payment instrument option. The payment instrument option may be an identification of an instrument that facilitates online payment or that otherwise satisfies the payment stage of a checkout process for purchasing an item. Another type of selectable checkout option may be a selectable billing address option. The billing address option may be an identification of a billing address. Yet another type of selectable checkout option may be a selectable shipping address option. The shipping address option may be an identification of a shipping address. It is contemplated that for each type of selectable checkout option, one or more selectable checkout options may be provided. For example, in some embodiments, the plurality of selectable checkout options may comprise multiple payment instrument options (e.g., a user's PayPal account, the user's Visa credit card account, and the user's MasterCard credit card account), a billing address option (e.g., a billing address for both the user's PayPal account and the user's Visa credit card account), and multiple shipping address options (e.g., the user's home address and the user's work address). In this example, there are three types of selectable checkout options (payment instrument, billing address, and shipping address), each having a different number of selectable options. It is contemplated that other configurations are possible as well.

In some embodiments, the selectable checkout options may be displayed in the form of selectable buttons. However, it is contemplated that the selectable checkout options may displayed in other forms as well.

The checkout option display module 234 may also be configured to receive an indication of a selection of the item identifier and indications of selections of the selectable checkout options. It is contemplated that selection of the item identifier and any of the selectable checkout options may be indicated in a variety of ways. In some embodiments, a selection is indicated by a user's interaction with the item identifier or a selectable checkout option. This interaction may comprise a user touching a display of a device (e.g., touching a touchscreen with a finger or a stylus) or a user manipulating a pointer (e.g., using a mouse or a touchpad). In some embodiments, a user may select an item identifier or a checkout option by clicking or tapping on it or by holding a finger, stylus, or pointer in a proximate location to the item identifier of checkout option for a predetermined amount of time. It is contemplated that other types of interaction may be employed as well.

The checkout option display module 234 may also be configured to cause a visual representation of the selection of the selectable item identifier and a visual representation of the selection of any of the selectable checkout options to be displayed on the single page. In some embodiments, the visual representation of the selection of a selectable item identifier may comprise an icon of the selected item identifier and the visual representation of the selection of a selectable checkout option may comprise an icon of the selected checkout option. In some embodiments, the visual representations of the selections are smaller versions of how the corresponding selected item identifier or checkout option is displayed. For example, if an image of a bicycle is used as a selectable item identifier for a bicycle item listing, a small icon that is similar to the image of the bicycle may be used as a visual representation of the selection of the bicycle. It is contemplated that the visual representations of selections may also comprise text or any other suitable visual identifiers. In some embodiments, an identifier corresponding to a photo image is a graphic representation of that image.

In some embodiments, the checkout option display module may be configured to cause movement of the visual representation of the selected item identifier and/or movement of the visual representation of the selected checkout options to be displayed on the single page in response to user input. This user input may be any user interaction with the visual representation(s), such as any of the user interactions previously discussed. For example, in some embodiments, a user may touch a cell phone's screen with a finger at a location proximate to the location of the visual representation of the selected item identifier and/or the location of the visual representation of the selected checkout option(s) and move the finger along the screen, which may result in the visual representation(s) being moved in a fashion corresponding to the movement of the finger. However, it is contemplated that other user interactions may be enabled to cause the movement of the visual representation(s) as well. In some embodiments, the checkout option display module may be configured to cause the visual representations of the selections to be displayed as being attached to one another. In some embodiments, movement of one of the visual representations of the selections may be matched by a corresponding movement of any of the visual representations that are attached to it.

In some embodiments, the checkout option display module may be configured to cause at least one of the selectable checkout options to be unavailable for selection in response to a previous selection of a different selectable checkout option. In some embodiments, the checkout option being made to be unavailable for selection is of a different type than the checkout option for which the previous selection was made. For example, in some embodiments, a selection of a payment instrument option may cause certain billing address options or certain shipping address options that were previously available for selection to be made unavailable for selection. In some embodiments, the selection of the item identifier may also result in one or more of the selectable checkout options being made unavailable for selection. For example, in some embodiments, a selection of an item identifier may cause certain payment instrument options to be made unavailable for selection.

Although FIGS. 1 and 2 illustrate the checkout option display module 234 being one of many applications 120 and 122 that may reside on the application server 118 of the networked system 102, it is contemplated that the checkout option display module 234 may reside in other locations as well. For example, in some embodiments, the checkout option display module 234 may reside on a client device (e.g., client machine 110 or client machine 112). In some embodiments, this client device may be a mobile device (e.g., a cell phone). The incorporation of the checkout option display module 234 into a mobile device will be discussed in further detail below with respect to FIG. 5.

In some embodiments, the checkout option display module 234 may be configured to generate the single page using checkout options that are presented over multiple web pages of a checkout process for an item listing. For example, in some embodiments, the payment instrument options may be presented on one web page of a checkout process for an item listing, while the billing address options and the shipping address options may be presented on a different web page of the checkout process than the payment instrument options. In some embodiments, each one of the checkout options presented over the multiple web pages of the checkout process may be used to generate a corresponding selectable checkout option on the single page. For example, the payment instrument options presented on the one web page may be used to generate corresponding selectable payment instrument options on the single page, and the billing address options and the shipping address options presented on the different web page may be used to generate corresponding selectable billing address options and selectable shipping address options on that same single page.

FIGS. 3A-3H illustrate different stages of a checkout process where selectable checkout options may be presented on a single page or screen 300, according to some embodiments. The features disclosed with respect to FIGS. 3A-3H may be enabled by the checkout option display module 234. In some embodiments, the single page 300 may be displayed or caused to be displayed on a device. The device may be a mobile device (e.g., a cell phone). However, it is contemplated that other devices are within the scope of the present disclosure, such as a point of sale device which receives inputs on the display screen.

Figure 3A:
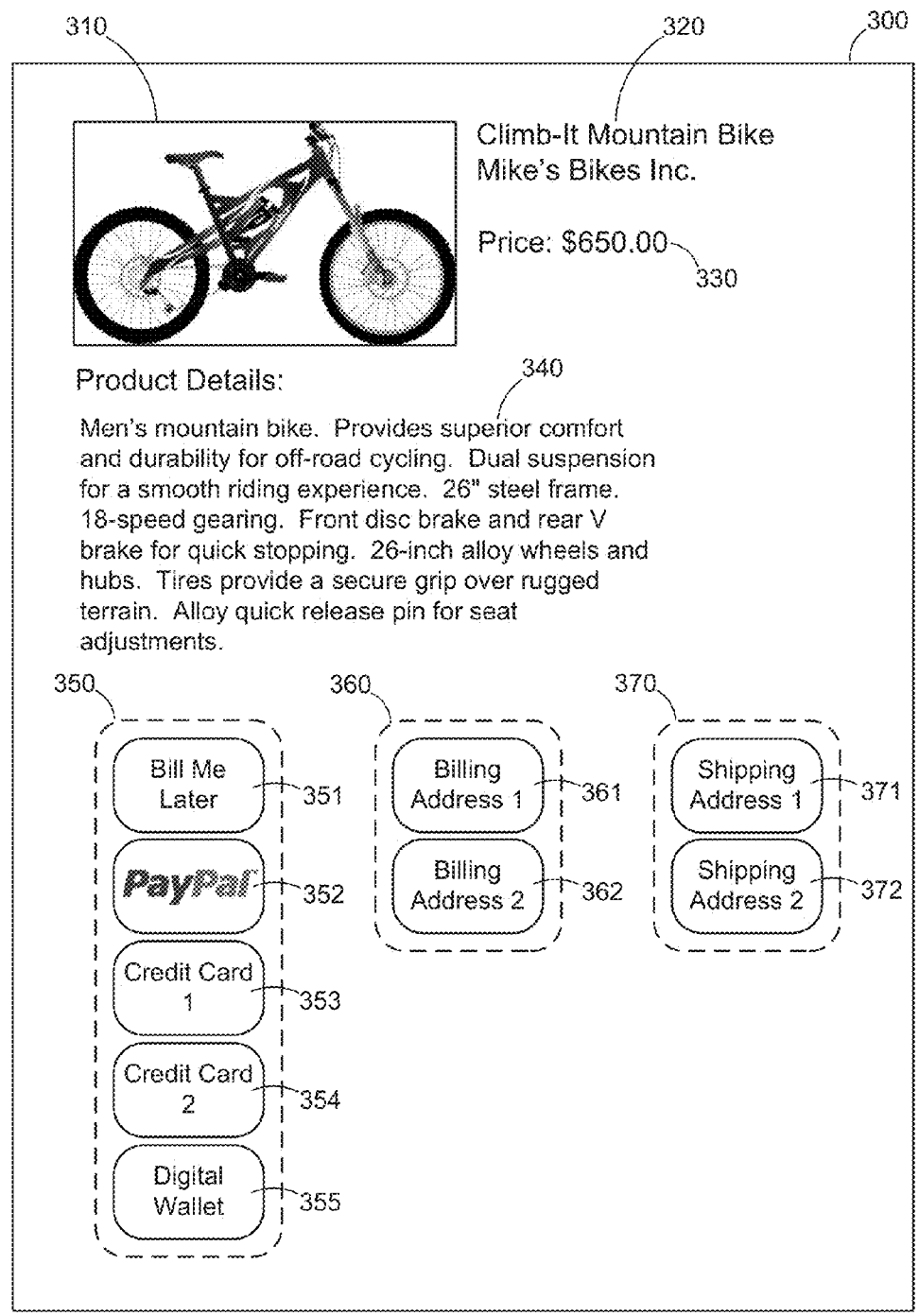

In FIG. 3A, the single page or screen 300 may comprise an item listing for an item available for purchase. The single page 300 may comprise information for the item listing. This information may include, but is not limited to, a name or title 320 for the item of the item listing, a purchase price 330 for the item, and/or details or a description 340 of the item. In FIG. 3A, the item of the item listing may be a mountain bike, having a name 320 "Climb-It Mountain Bike" and a purchase price 330 of $650.00. Details 340 of the mountain bike may be provided, such as product details, store details, payment options, discounts, and so forth.

The single page 300 may comprise a selectable item identifier 310. The selectable item identifier 310 may be any visual identification of the item, which, when selected by the user, visually indicates that the user intends to purchase the item. In some embodiments, the selectable item identifier 310 may comprise an image of, or otherwise related to, the item. However, it is contemplated that the selectable item identifier 310 may be something other than an image. In some embodiments, the selectable item identifier 310 may additionally or alternatively comprise text. In some embodiments, the selectable item identifier 310 may comprise the name or title 320 for the item, the purchase price 330 for the item, and/or the details/description 340 of the item. It is contemplated that the selectable item identifier 310 may comprise other forms as well. In one example, the selectable item identifier may include quality or price indicators, such as a red line for low quality products and blue line for high quality products. Similarly, the selectable item identifier may include other indicators or information, such as a seller rating, an energy rating, an environmental indicator, and so forth. By presenting alternate information with the selectable item identifier, space is conserved on the user display and the information is easily absorbed and understood by the user.

The single page 300 may comprise different types of selectable checkout options. In some embodiments, all the different types of checkout options required for completion of a checkout process for an item may be displayed on the single page 300. It is contemplated that for each type of selectable checkout option, one or more selectable checkout options may be provided. A first type of selectable checkout option may be one or more selectable payment instrument options 350. As these are typically well-known options to the user, these may be presented in a simple display format, such as a logo or an icon.

In some embodiments, the selectable checkout options may be configured by the user. The user may configure options with user-specific graphic presentation formats, such as to identify one or more payment options with specific color lines. In one such example, the Visa card payment option may be presented as a red line or a red dot, and the PayPal option may be presented as a blue line or a blue dot. A variety of configurations are contemplated, specific to the user and/or the option provider.

A second type of selectable checkout option may be one or more selectable billing address options 360. Yet another type of selectable checkout option may be one or more selectable shipping address options 370. It is contemplated that other configurations of selectable checkout options may be used as well.

Each payment instrument option 350 may be an identification of an instrument that facilitates online payment or that otherwise satisfies the payment stage of a checkout process for purchasing an item. In some embodiments, the selectable payment instrument options 350 may comprise a selectable Bill Me Later option 351 (which may identify a user's Bill Me Later account), a selectable PayPal option 352 (which may identify a user's PayPal account), a first selectable credit card option 353 (which may identify a user's credit card account), a second selectable credit card option 354 (which may identify another credit card account of the user), and a selectable digital wallet option 355 (which may identify a user's digital wallet). It is contemplated that other configurations of selectable payment instrument options 350 may be used as well.

Each billing address option 360 may be an identification of a billing address that may be used for at least one of the payment instrument options 350. In some embodiments, the selectable billing address options 360 may comprise a first selectable billing address option 361 (which may identify a user's billing address) and a second selectable billing address option 362 (which may identify another billing address of the user). It is contemplated that other configurations of selectable billing address options 360 may be used as well.

Each shipping address option 370 may be an identification of a shipping address for a user. In some embodiments, the selectable shipping address options 370 may comprise a first selectable shipping address option 371 (which may identify a user's shipping address) and a second selectable shipping address option 372 (which may identify another shipping address of the user). It is contemplated that other configurations of selectable shipping address options 370 may be used as well.

In some embodiments, the selection of one type of selectable checkout option may change the availability of selectable checkout options of another type. For example, the selection of one of the payment instrument options 350 may prevent one of the billing address options 360 from being able to be selected. This change in selection availability will be discussed in further detail below with respect to FIGS. 4A-4E.

In some embodiments, a user may select the selectable item identifier 310 or any of the selectable checkout options 350, 360, 370 by interacting with it. This interaction may comprise a user touching a display screen of a device (e.g., touching a touchscreen with a finger or a stylus) or a user manipulating a pointer (e.g., using a mouse or a touchpad). In some embodiments, a user may select a selectable item identifier 310 or a selectable checkout option 350, 360, 370 by clicking or tapping on it or by holding a finger, stylus, or pointer in a proximate location to it for a predetermined amount of time. It is contemplated that other types of interaction may be employed as well to select the selectable item identifier 310 or any of the selectable checkout options 350, 360, 370.

In some embodiments, selection of the selectable item identifier 310 or any of the selectable checkout options 350, 360, 370 may result in a visual representation of the selection being displayed on the single page 300. In some embodiments, the visual representation of the selection may comprise an icon of the corresponding selected item identifier 310 or selected checkout option 350, 360, 370. In some embodiments, the visual representation of the selection may be a smaller version of how the corresponding selected item identifier 310 or selected checkout option 350, 360, 370 is displayed. It is contemplated that the visual representation of the selection may also comprise text or any other suitable visual identifiers.

Figure 3B:
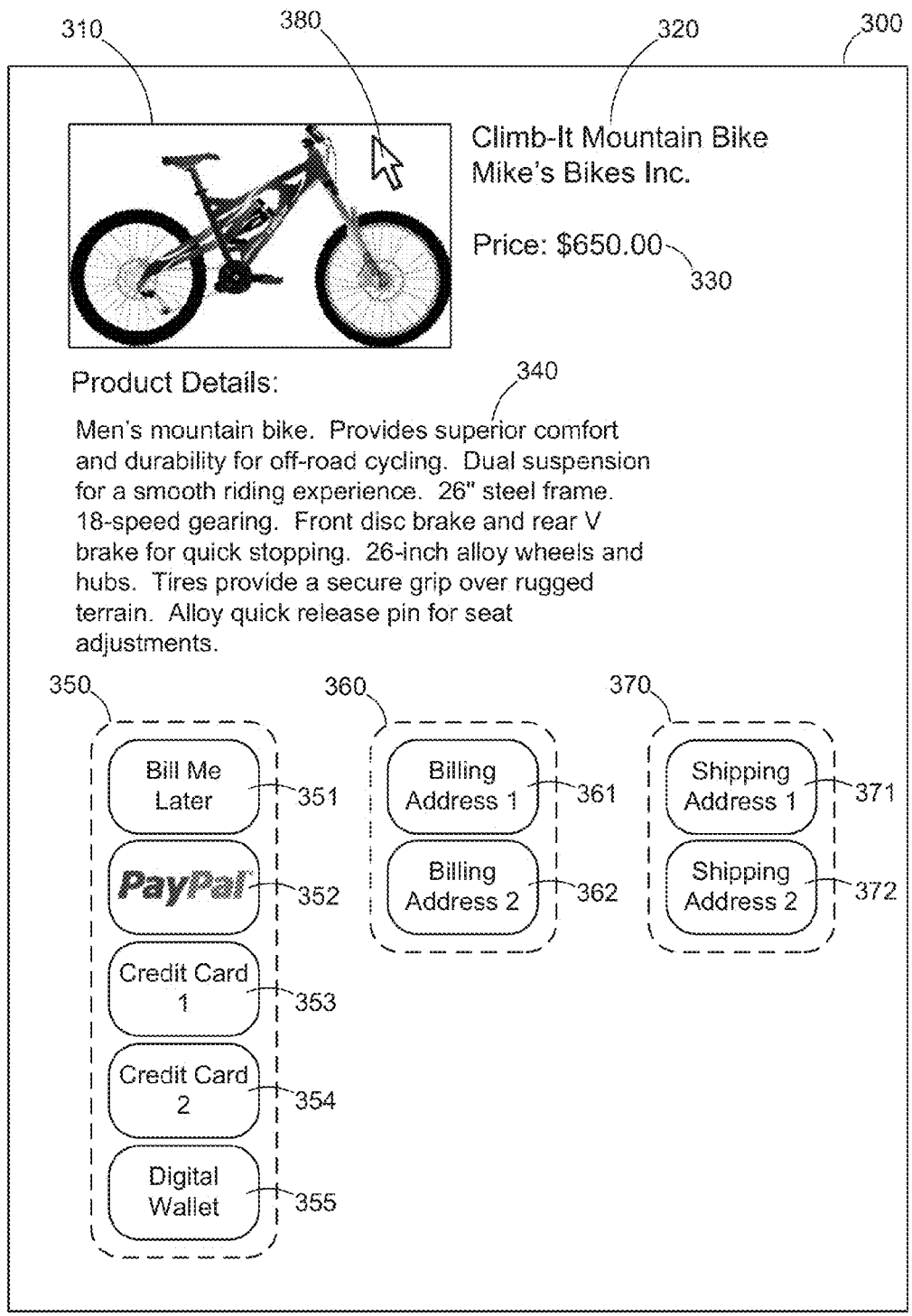

In FIG. 3B, the same page 300 is presented to the user and the user may select the selectable item identifier 310 using a pointer 380. In some embodiments, the user may select the selectable item identifier 310 by clicking/tapping the selectable item identifier 310 using the pointer 380 or by placing the pointer 380 over the selectable item identifier 310 for a predetermined amount of time. In some embodiments, the user touches the selectable item identifier 310 and holds the touch for a few seconds, indicating selection of the item. Where the user desires to deselect the item, the user may just slide their finger or stylus sideways as if to shake the item off and the item will not be selected. This allows the user to navigate the page 310 easily and correct mistakes or spurious selections.

On selection of an item, an application on the mobile device may store the information until completion of all transaction information, at which time the device may send the complete transaction information to the networked server 102. In such application, the display information is stored for each selection option, and responds to each selection without communications with networked server 102. Here, the networked server 102 receives the complete transaction information, processes the transaction and provides confirmation of the transaction to the mobile device.

The networked server 102 may send optimizations to the application resident on the mobile device, and provide instructions for operation, display and processing to the application. This enables the application to benefit from continual improvement of transaction processing.

In some embodiments, an application on the mobile device may send each selection to the networked server 102 at the time of selection by the user, which enables the server 102 to respond by sending instructions to the mobile device. Such embodiments enable the server 102 to change processes and continually optimize processing.

Figure 3C:
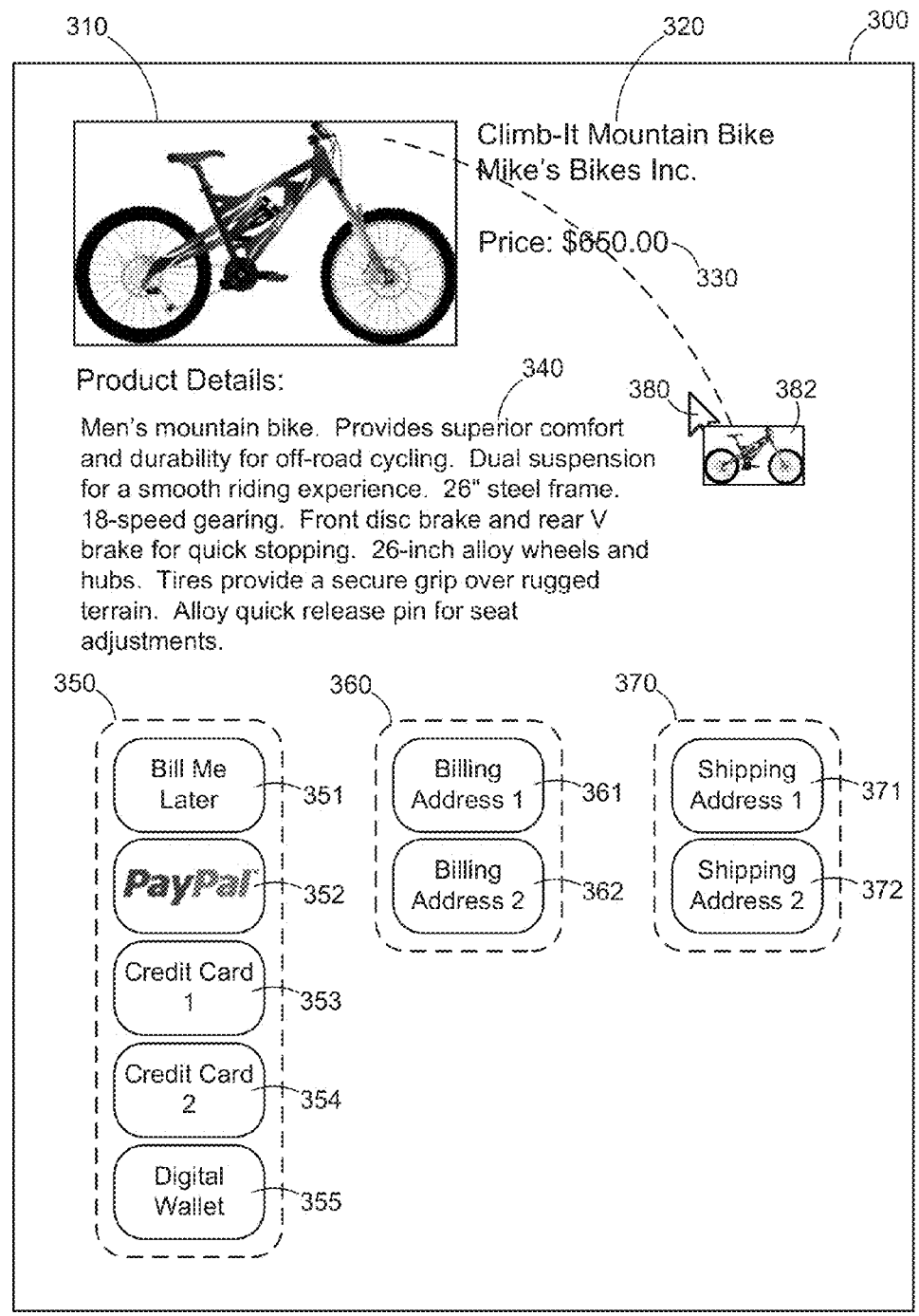

In FIG. 3C, in response to the use selecting the selectable item identifier 310, a visual representation 382 of the user's selection of the selectable item identifier 310 may be displayed on the single page 300. For example, in FIG. 3C, the visual representation 382 may comprise a small icon that is substantially identical to an image of a bicycle that is used for the selectable item identifier 310. It is contemplated that other forms of the visual representation 382 are also within the scope of the present disclosure. The visual representation 382 may also include visual or audio indicators of the selected item. For example, the visual representation 382 for a bike may include a flag of the country of origin; the visual representation 382 for a music package, such as a compact disc (CD), may include an audio track of the music on the CD. A variety of visual representations are considered, allowing the merchant, the device manufacturer, and/or the user flexibility in configuring the shopping or transaction experience.

Figure 3D:
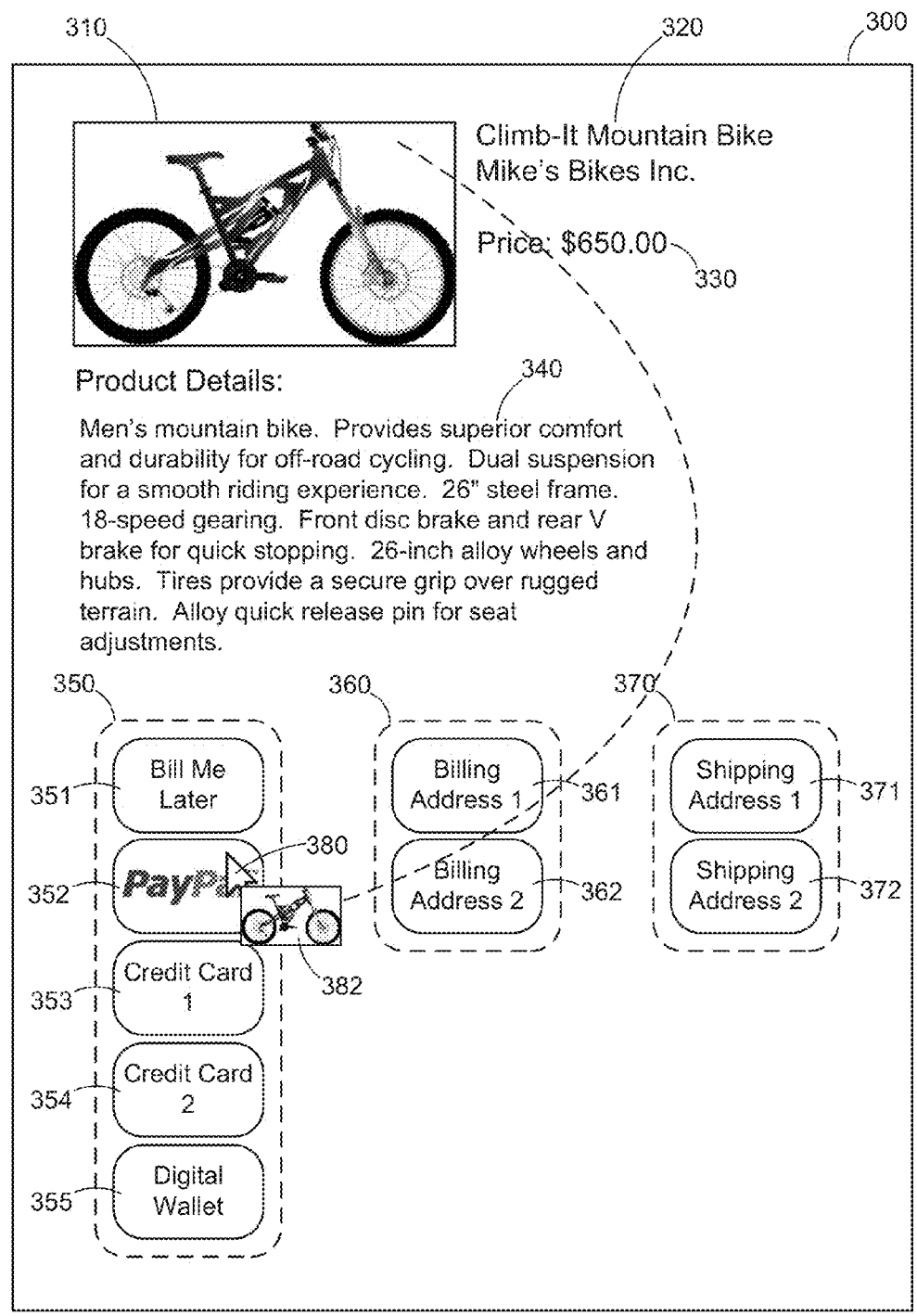

In some embodiments, the visual representation 382 is displayed as attached to the pointer 380. Accordingly, the visual representation 382 moves with the pointer 380, as seen in FIGS. 3C and 3D, where the user moves the pointer 380 and the attached visual representation 382 along the path of the dotted line, from the selectable item identifier 310 to one of the selectable payment instrument options 350. The pointer 380 may be replaced with the visual representation 382, or the visual representation 382 may be appended to the pointer 380. This provides a visual user activity trail, enabling the user to easily track his or her activity in this transaction, unlike conventional systems, where once the selection is made, the user proceeds to the next screen and the information is presented to the user in a different format and presentation, and often the item presentation information is not visible.

Figure 3E:
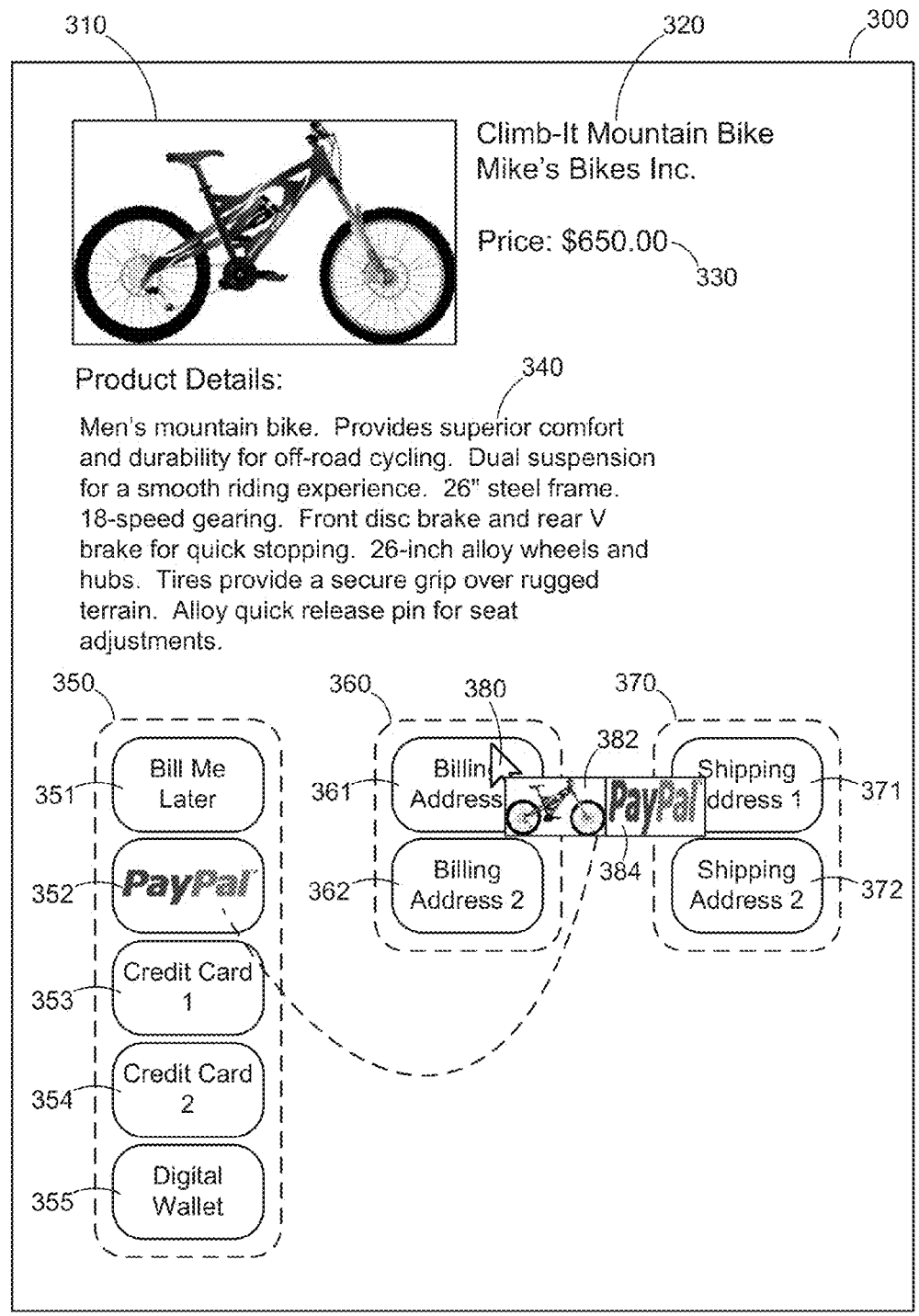

In FIG. 3D, the user may select the PayPal option 352 using the pointer 380. As a result of the user selecting the PayPal option 352, a visual representation 384 of the user's selection of the PayPal option 352 may be displayed on the single page 300, as shown in FIG. 3E. In FIG. 3E, the visual representation 384 may comprise a small icon that is substantially identical to an image or text used for the PayPal option 352. It is contemplated that other forms of the visual representation 384 are also within the scope of the present disclosure. In some embodiments, the visual representation 384 may be displayed as being attached to the pointer 380 and the visual representation(s) of any other selections. Accordingly, the visual representation 384 moves with the pointer 380, as seen in FIG. 3E, where the user moves the pointer 380 with the attached visual representations 382 and 384 along the path of the dotted line, from the PayPal option 352 to one of the selectable billing address options 360.

Figure 3F:
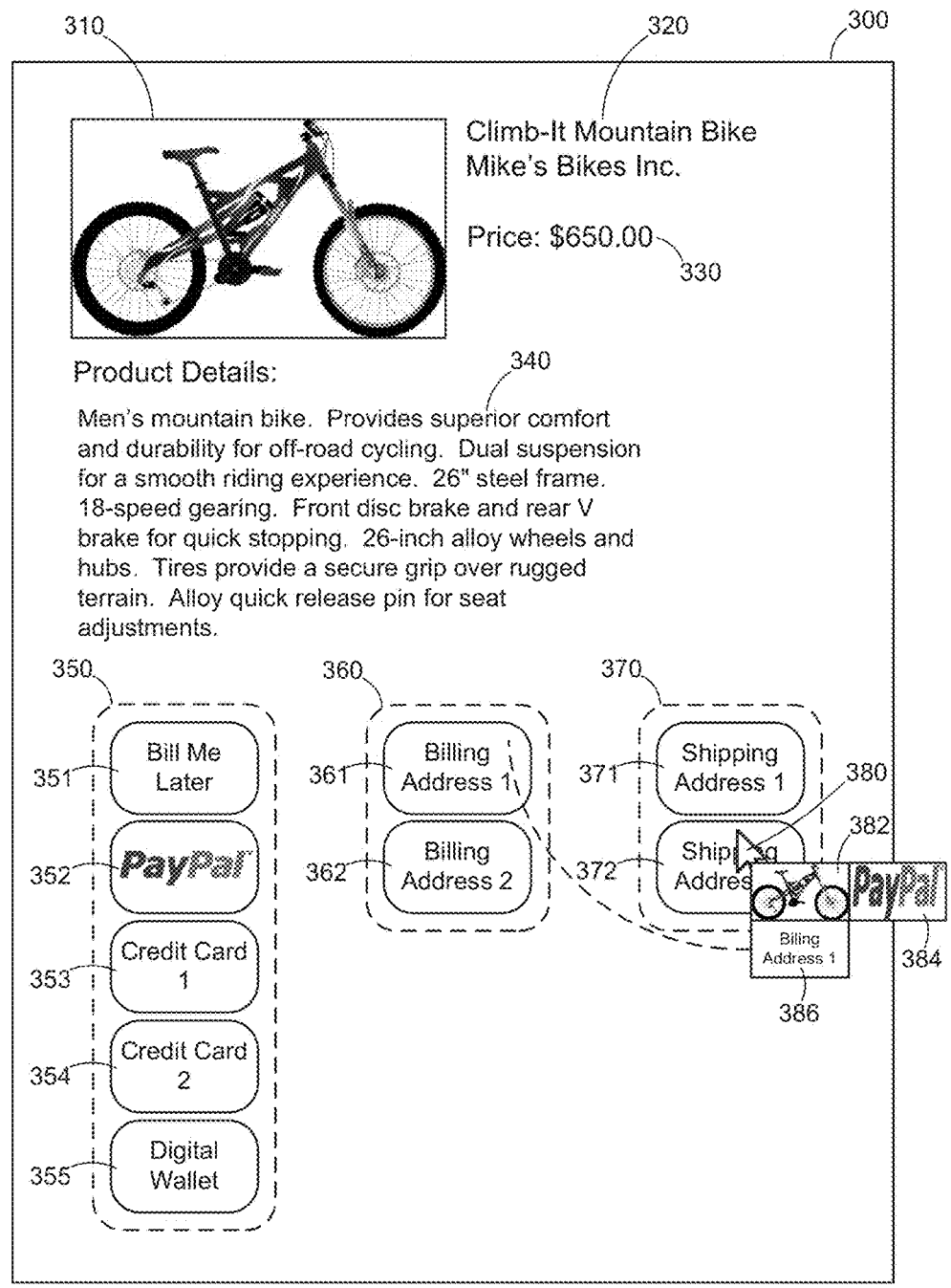

In FIG. 3E, the user may select the first billing address option 361 using the pointer 380. As a result of the user selecting the first billing address option 361, a visual representation 386 of the user's selection of the first billing address option 361 may be displayed on the single page 300, as shown in FIG. 3F. In FIG. 3F, the visual representation 386 may comprise a small icon that is substantially identical to an image or text used for the first billing address option 361. It is contemplated that other forms of the visual representation 386 are also within the scope of the present disclosure. In some embodiments, the visual representation 386 may be displayed as being attached to the pointer 380 and the visual representation(s) of any other selections (e.g., the visual representation 384 of the PayPal option 352). Accordingly, the visual representation 386 moves with the pointer 380, as seen in FIG. 3F, where the user moves the pointer 380 and the attached visual representations 382, 384, and 386 along the path of the dotted line, from the first billing address option 361 to one of the selectable shipping address options 370.

Figure 3G:
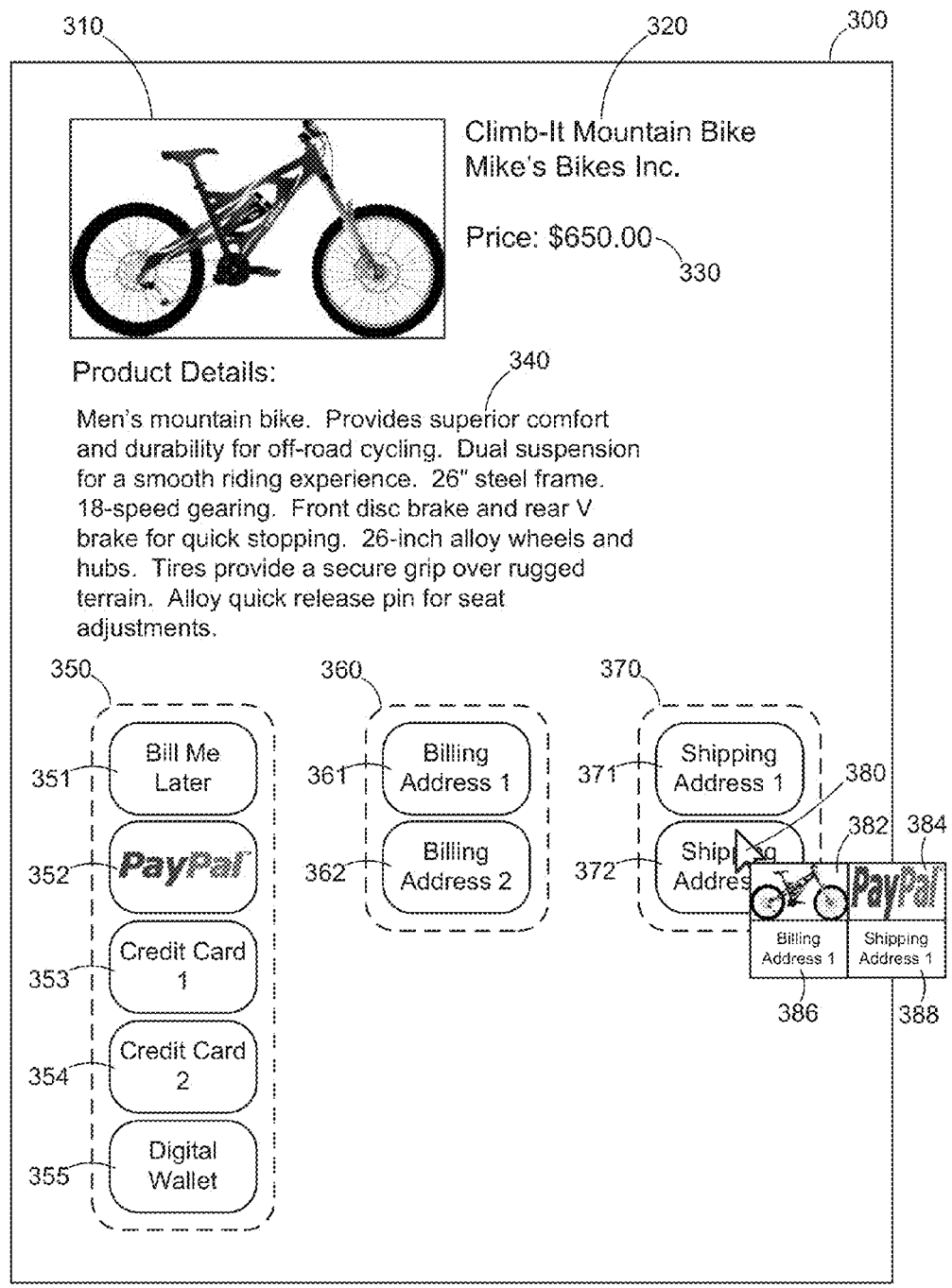

In FIG. 3F, the user may select the second shipping address option 372 using the pointer 380. As a result of the user selecting the second shipping address option 372, a visual representation 388 of the user's selection of the second shipping address option 372 may be displayed on the single page 300, as shown in FIG. 3G. In FIG. 3G, the visual representation 388 may comprise a small icon that is substantially identical to an image or text used for the second shipping address option 372. It is contemplated that other forms of the visual representation 388 are also within the scope of the present disclosure. In some embodiments, the visual representation 388 may be displayed as being attached to the pointer 380 and the visual representation(s) of any other selections (e.g., the visual representation 384 of the PayPal option 352 and the visual representation 386 of the first billing address option 362). Accordingly, the visual representation 388 may be moved by moving the pointer 380.

The selection of an item, as well as payment or other options, may be made in a variety of ways, including touching the item or option, sliding a finger or stylus to each item or option, hovering a finger or stylus over the item or option, clicking on an item or option, and so forth. A touch screen enables a variety of input types and these may be used for selection of an item. On a mobile device, for example, the user may slide his or her finger from the item to the other options, wherein the selections are displayed to the user as a combination of each selection.

Figure 3H:
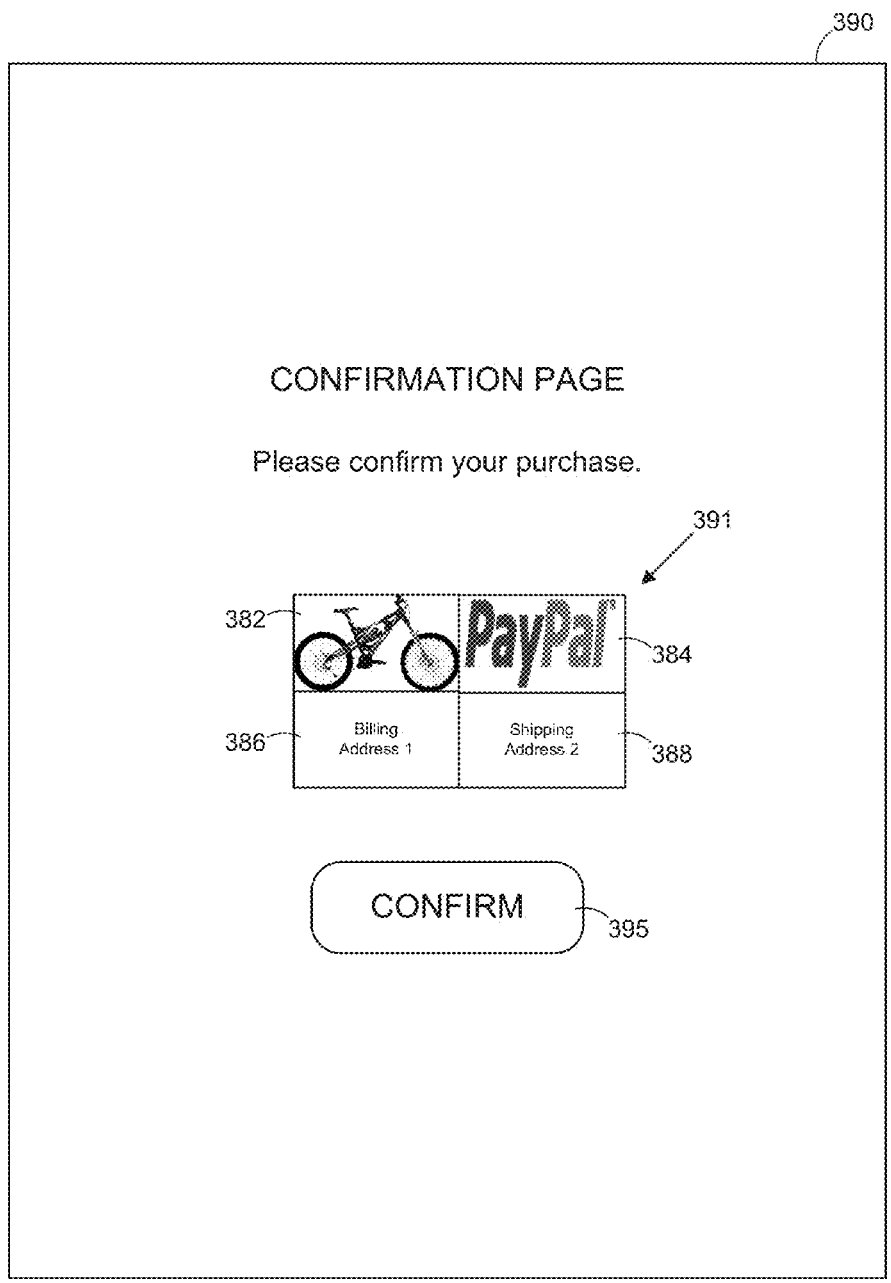
Figure 31:
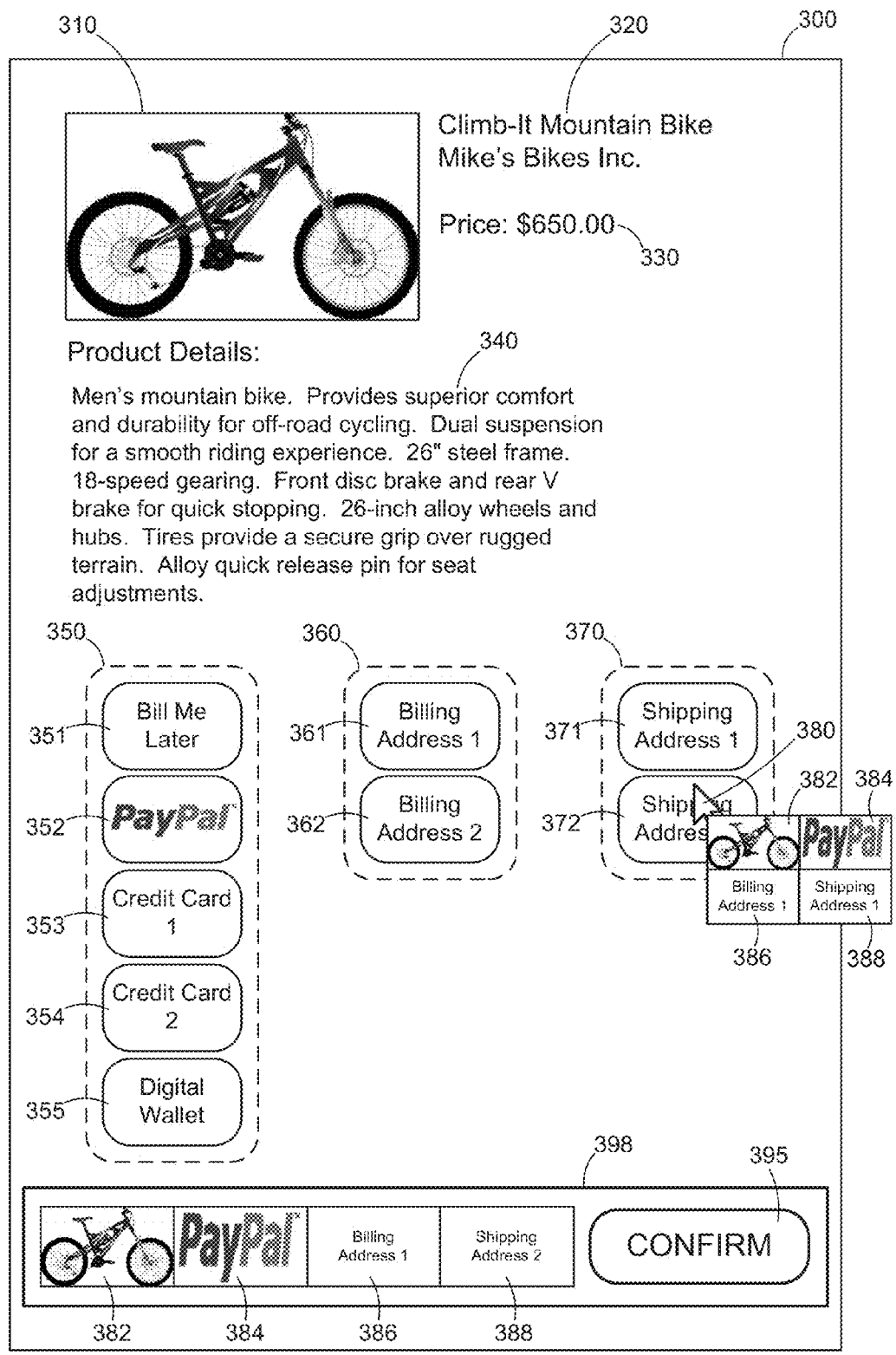

In some embodiments, selection of the selectable item identifier 310 or any of the selectable checkout options 350, 360, 370 may result in the selection being used to populate an e-commerce shopping cart. In some embodiments, the user may be enabled to confirm the selections upon making all of the selections necessary to complete the checkout process or in response to selecting a submit button, or some other mechanism, to indicate that the user is ready to complete the checkout process. In FIG. 3H, a confirmation page 390 may be presented to the user. The confirmation page 390 may display the visual representations of the user's selections as a transaction composite 391. For example, in some embodiments, the confirmation page 390 may display the visual representation 382 of the selected item identifier 310, the visual representation 384 of the selected PayPal option 352, the visual representation 386 of the selected first billing address option 361, and the visual representation 388 of the second shipping address option 372. The confirmation page 390 may enable the user to confirm these selections and submit them for processing by the appropriate entities. In some embodiments, the confirmation page 390 may enable the user to confirm these selections and submit them for processing by providing a selectable confirmation button 390. It is contemplated that other selectable confirmation and submission mechanisms are within the scope of the present disclosure. In some embodiments, the user may be enabled to change one or more of the checkout options. For example, in some embodiments, the user may be able to select (e.g., click or tap) one of the visual representations 382, 384, 386, or 388 and be brought back to the single page 300. In some embodiments, the user may change a selected checkout option by selecting another checkout option of the same type. For example, referring back to FIG. 3F, the user may change the selection of the first billing address option 361 to a selection of the second billing address option 362 by selecting the selectable second billing address option 362. As a result of this selection, the visual representation of the selected first billing address option 386 may be replaced with a visual representation of the selected second billing address option (not shown). The confirmation page may be presented as a separate page or may be presented as a banner on the page 300, similar to a header or footer. FIG. 3I illustrates one embodiment of the elements of the confirmation page being presented as a banner 398 on the page 300, where the user is prompted to confirm the transaction on page 300 in the banner 398 with confirm button 395 placed in the banner 398, along with the visual representations 382, 384, 386, or 388 of the user's selections.

Figure 3J:
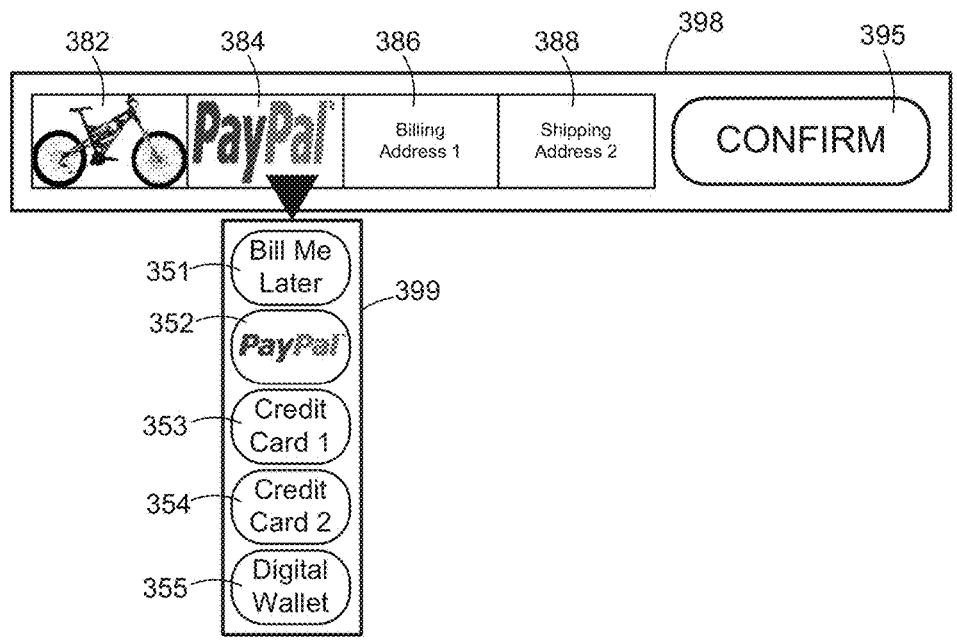
FIG. 3J illustrates an example embodiment of using a drop-down menu to change a selected checkout option during a checkout process for a computing device.

In some embodiments, the confirmation presentation includes multiple visual representations of the selected item (s) and option(s), such as in the banner 398 or on page 390, wherein each of the visual representations for the selected option(s) includes a user interface control element to change the selection during confirmation. FIG. 3J illustrates one embodiment of a drop-down menu 399 being used as a user interface control element with the banner 398 to enable the user to change a selected checkout option. The ability to change one or more of the transaction elements, such as the selectable options, provides flexibility. Once a modification is made to any of the selectable options, the visual representation for that option changes as well. For example, when a user changes the payment method from PayPal to Credit Card 1, the visual representation for the payment option will change to display a visual representation for Credit Card 1.

Additionally, in some embodiments, selection of the digital wallet provides a menu of options to select from within the digital wallet.

Discount offers, coupons, promotions and so forth may be presented to the user during the transaction process or at confirmation. For example, at confirmation, the visual display for the payment option may include special discounts or incentives applied to the transaction, and these may be visually displayed with the confirmation information.

Figure 3K:
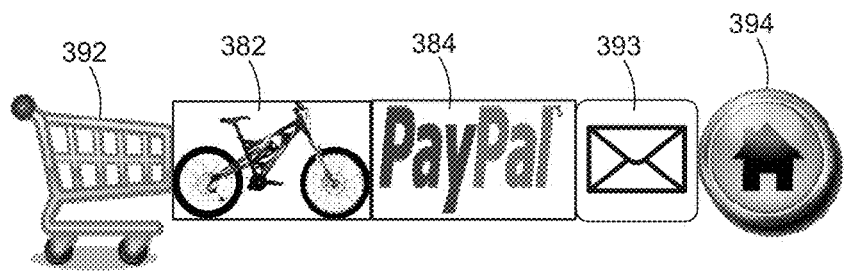
FIGS. 3K and 3L illustrate example embodiments of various display configurations that may be used during a checkout process for a computing device.

In some embodiments, user selection of an item results in an animation of the item, such as for a bicycle wheel to rotate. In some embodiments, the selectable item identifier 310 may flash to indicate user selection of the item. In some embodiments the visual display of the item in selectable item identifier 310 may move to an image of a shopping cart 392 which replaces the cursor arrow display, as illustrated in FIG. 3K. The shopping cart 392 then moves with the touch of the user on the display screen of the computing device.

As illustrated in FIG. 3K, in some embodiments, the shopping cart 392 is displayed and the item and options are appended thereto. In this example, the shopping cart 392 includes visual displays of the item 382, the payment option 384, the billing address 393, and the shipping address 394. In some embodiments, the visual displays may comprise simple graphic representations of the user's selections. For example, the visual display of the billing address 393 may simply comprise a envelope icon, which may be used to represent a particular billing address for the user, and the shipping address 394 may comprise a home icon, which may be used to represent the home address for the user.

Figure 3L:
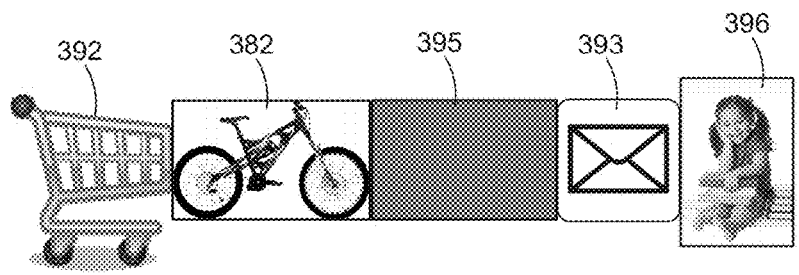

In some embodiments, these visual displays are configured by the user or merchant of the networked system so that only the user can read and interpret the representations. For example, the visual displays may be color coded such that the user understands the significance, but others viewing the device display will not understand the selections. Consider FIG. 3L where such a color coding is used for the visual display of payment option 395. In another example, the item is selected to be shipped to a child, and a photo of the child 396 provides the visual representation of the shipping address.

In some embodiments, a local pickup may be a selectable option. Where the transaction involves a local purchase, such as for local pickup at a store or other location, a map to the location may also be presented to the user; text instructions to the location may be provided with or in place of the map.

In some embodiments, the selection of one type of selectable checkout option may change the availability of selectable checkout options of another type. FIGS. 4A-4E illustrate different stages of a checkout process where selectable checkout options may be presented on a single page 400, according to some embodiments, where selection of one type of selectable checkout option changes the availability of selectable checkout options of another type. The features disclosed with respect to FIGS. 4A-4E may be enabled by the checkout option display module 234. It is contemplated that any of the features disclosed with respect to FIGS. 4A-4E may be combined with any of the features disclosed with respect to FIGS. 3A-3H. In some embodiments, the single page 400 may be displayed or caused to be displayed on a device. The device may be a mobile device (e.g., a cell phone). However, it is contemplated that other devices are within the scope of the present disclosure.

Figure 4A:
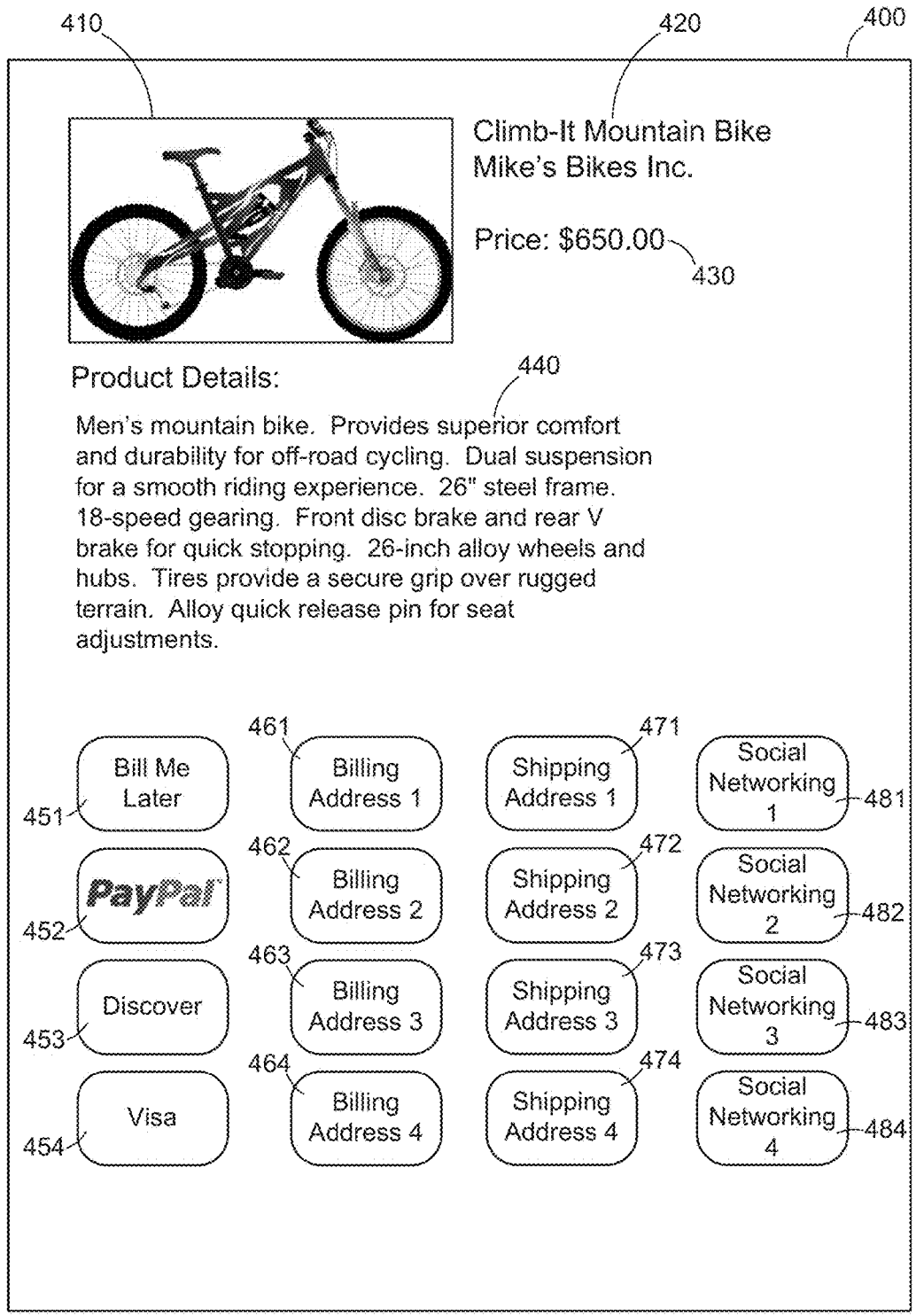
FIGS. 4A-4E illustrate different stages of a checkout process for a computing device where selectable checkout options are presented on a single page on a device, according to some embodiments.

In FIG. 4A, the single page 400 may comprise an item listing for an item available for purchase, similar to the item listing of the single page 300 in FIGS. 3A-3G. The single page 400 may comprise information for the item listing. This information may include, but is not limited to, a name or title 420 for the item of the item listing, a purchase price 430 for the item, and/or details or a description 440 of the item. In FIG. 4A, the item of the item listing may be a mountain bike, having a name 420 "Climb-It Mountain Bike" and a purchase price 430 of $650.00. Details 440 of the mountain bike may be provided.

The single page 400 may comprise a selectable item identifier 410. The selectable item identifier 410 may be any visual identification of the item, which, when selected by the user, visually indicates that the user intends to purchase the item. In some embodiments, the selectable item identifier 410 may comprise an image of, or otherwise related to, the item. However, it is contemplated that the selectable item identifier 410 may be something other than an image. In some embodiments, the selectable item identifier 410 may additionally or alternatively comprise text. In some embodiments, the selectable item identifier 410 may comprise the name or title 420 for the item, the purchase price 430 for the item, and/or the details/description 440 of the item. It is contemplated that the selectable item identifier 410 may comprise other forms as well.

The single page 400 may comprise different types of selectable checkout options. In some embodiments, all the different types of checkout options required for completion of a checkout process for an item may be displayed on the single page 400. As previously discussed with respect to FIGS. 3A-3G, it is contemplated that for each type of selectable checkout option, one or more selectable checkout options may be provided. A first type of selectable checkout option may be one or more selectable payment instrument options 451, 452, 453, and 454. A second type of selectable checkout option may be one or more selectable billing address options 461, 462, 463, and 464. Yet another type of selectable checkout option may be one or more selectable shipping address options 471, 472, 473, and 474. Yet another type of selectable checkout option may be one or more selectable social networking options 481, 482, 483, and 484. It is contemplated that other configurations of selectable checkout options may be used as well.

Each payment instrument option may be an identification of an instrument that facilitates online payment or that otherwise satisfies the payment stage of a checkout process for purchasing an item. In some embodiments, the selectable payment instrument options may comprise a selectable Bill Me Later option 451 (which may identify a user's Bill Me Later account), a selectable PayPal option 452 (which may identify a user's PayPal account), a first selectable credit card option 453 (which may identify a user's credit card account, e.g., a Discover account), and a second selectable credit card option 454 (which may identify another credit card account of the user, e.g., a Visa account). It is contemplated that other configurations of selectable payment instrument options may be used as well.

Each billing address option may be an identification of a billing address that may be used for at least one of the payment instrument options. In some embodiments, the selectable billing address options may comprise a first selectable billing address option 461 (which may identify a first billing address for the user), a second selectable billing address option 462 (which may identify a second billing address of the user), a third selectable billing address option 463 (which may identify a third billing address of the user), and a fourth selectable billing address option 464 (which may identify a fourth billing address of the user). It is contemplated that other configurations of selectable billing address options may be used as well.

Each shipping address option may be an identification of a shipping address for a user. In some embodiments, the selectable shipping address options may comprise a first selectable shipping address option 471 (which may identify a first shipping address for the user), a second selectable shipping address option 472 (which may identify a second shipping address of the user), a third selectable shipping address option 473 (which may identify a third shipping address of the user), and a fourth selectable shipping address option 474 (which may identify a fourth shipping address of the user). It is contemplated that other configurations of selectable shipping address options may be used as well.

Each social networking option may be an identification of a social networking function that may be used to inform people in a user's social network about the user's activity regarding the item listing. Examples of social networking functions include, but are not limited to, the user expressing an appreciation of the item (e.g., eBay's "Like" function) and the user expressing a desire to have the item (e.g., eBay's "Add to Watch List" and "Want" functions). In some embodiments, the selected networking functions may be performed in response to the user completing the checkout process. In some embodiments, the selected networking functions may be performed upon being selected. As seen in FIG. 4A, in some embodiments, the selectable social networking options may comprise a first selectable social networking option 481 (which may identify a first social networking function), a second selectable social networking option 482 (which may identify a second social networking function), a third selectable social networking option 483 (which may identify a third social networking function), and a fourth selectable social networking option 484 (which may identify a fourth social networking function). It is contemplated that other configurations of selectable social networking options may be used as well.

In some embodiments, the social networking options may additionally or alternatively comprise social networks to which the user belongs (e.g., Facebook or LinkedIn). Upon completion of the checkout process, if any of these social networks has been selected, information about the user purchasing the item may be broadcast or published via the user's account for the selected social network. For example, if a user selects a Facebook social network option, then the user's Facebook friends may be notified of the user's purchase of the item in response to the user completing the purchase.

In some embodiments, a user may select the selectable item identifier 410 or any of the selectable checkout options by interacting with it. This interaction may comprise a user touching a display screen of a device (e.g., touching a touchscreen with a finger or a stylus) or a user manipulating a pointer (e.g., using a mouse or a touchpad). In some embodiments, a user may select a selectable item identifier 410 or a selectable checkout option by clicking or tapping on it or by holding a finger, stylus, or pointer in a proximate location to it for a predetermined amount of time. It is contemplated that other types of interaction may be employed as well to select the selectable item identifier 410 or any of the selectable checkout options.

In some embodiments, selection of the selectable item identifier 410 or any of the selectable checkout options may result in a visual representation of the selection being displayed on the single page 400. In some embodiments, the visual representation of the selection may comprise a modification in how the selected item identifier 410 or the selected checkout option was originally displayed. In some embodiments, this modification may include, but is not limited to, the border of the selected item identifier 410 or the selected checkout option being made bolder and the selected item identifier 410 or the selected checkout option being highlighted. It is contemplated that other forms of visual representation of a selection are also within the scope of the present disclosure, and that any of the forms of visual representation of a selection discussed above with respect to FIGS. 3A-3H may be used.

Figure 4B:
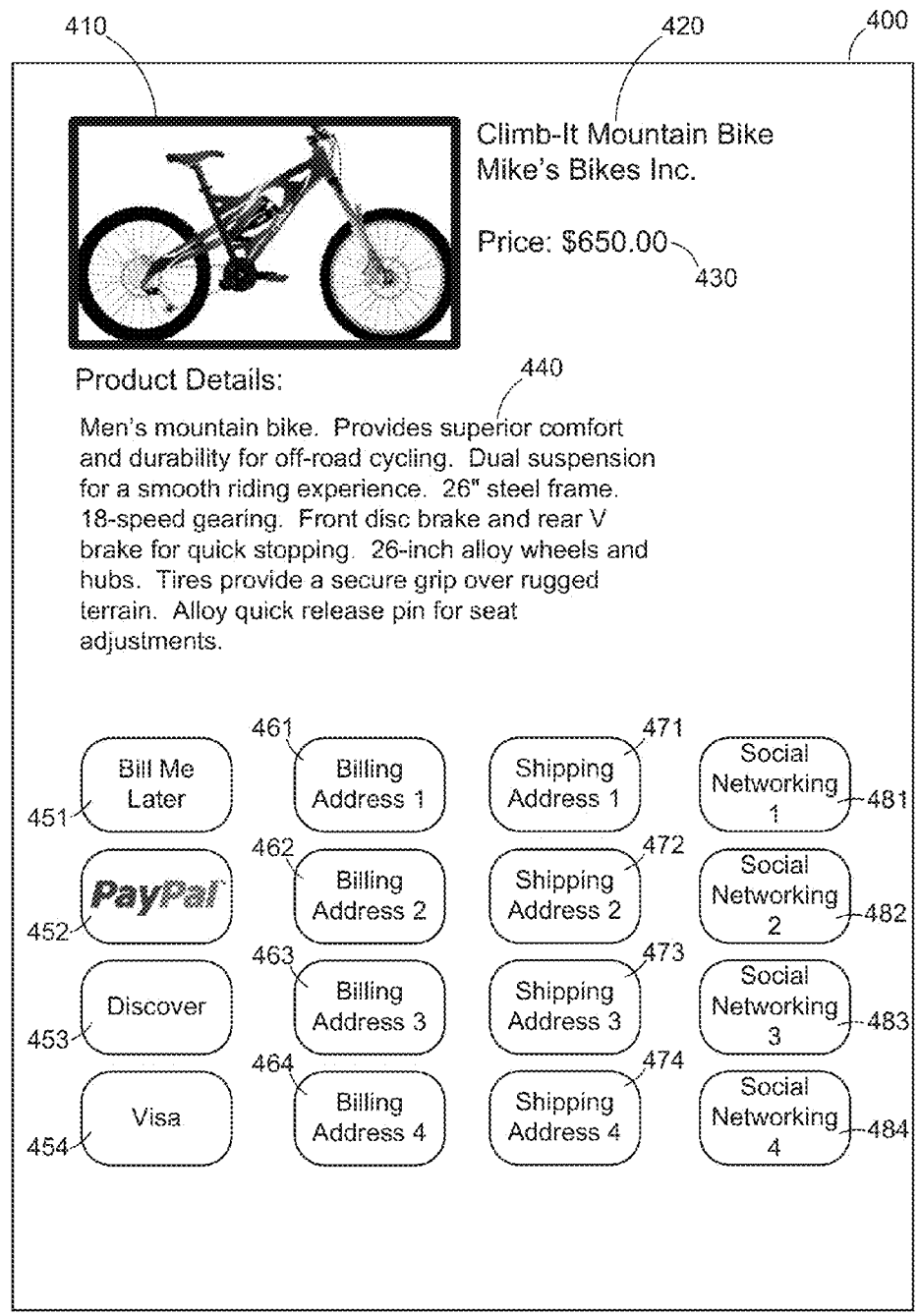

In FIG. 4B, a user may select the selectable item identifier 410 by touching a display screen in a location proximate the selectable item identifier 410 (e.g., over the selectable item identifier). It is contemplated that other forms of selection are within the scope of the present disclosure. In some embodiments, a visual representation of this selection is displayed in the form of the borders of the selectable item identifier 410 being made bolder, as illustrated around the bicycle in FIG. 4B. It is further contemplated that other forms of visual representation of this selection are within the scope of the present disclosure.

Figure 4C:
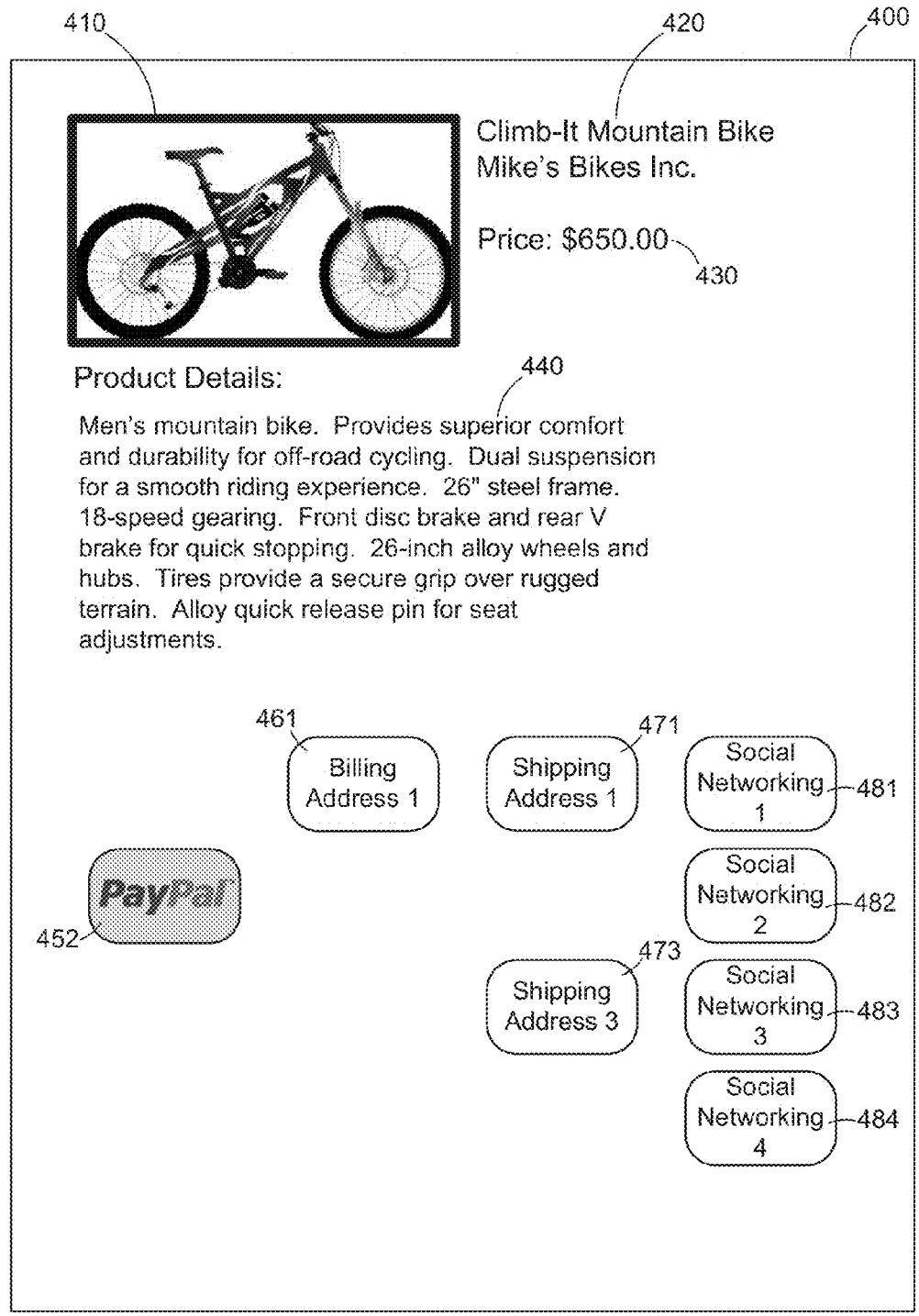

In FIG. 4C, the user may select the selectable PayPal option 452 by touching a display screen in a location proximate the selectable PayPal option 452 (e.g., over the PayPal option 452). It is contemplated that other selection mechanisms may be used and are within the scope of the present disclosure. In some embodiments, a visual representation of this selection is displayed in the form of the selectable PayPal option 452 being highlighted. However, it is contemplated that other forms of visual representation of this selection are within the scope of the present disclosure. In some embodiments the user may slide their finger or a stylus from one selection to the next, which is particularly useful and efficient on a mobile device.

While the examples of FIGS. 3A-4E illustrate a single selectable item, some embodiments enable selection of multiple items on a same page, wherein after selection of a first item and the transaction options, the user may continue to browse for further items. Upon selection of additional items and transaction options, the associated visual representations of the additional items and transaction options will be added to the visual representations of the first item and its transaction items.

As discussed above, in some embodiments, the selection of one type of selectable checkout option may change the availability of selectable checkout options of another type. For example, in FIG. 4C, the selection of the PayPal option 452 may make the second billing address option 462, the third billing address option 463, and the fourth billing address option 464 unavailable for selection, thereby leaving only the first billing address option 461 available for selection. Additionally, the selection of the PayPal option 452 may make the second shipping address option 472 and the fourth shipping address option 474 unavailable for selection, thereby leaving only the first shipping address option 471 and the third shipping address option 473 available for selection. In some embodiments, when only one selectable checkout option of a certain type remains available for selection, it may be automatically selected for the user. In some embodiments, when only one selectable checkout option of a certain type remains available for selection, it may remain unselected, awaiting selection by the user.

In some embodiments, selectable checkout options may be made unavailable for selection by being removed from display, as shown in FIG. 4C. However, it is contemplated that the selectable checkout options may be made unavailable in other ways as well, including, but not limited to, being unresponsive to the user attempting to interact with them (e.g., clicking or tapping them).

Figure 4D:
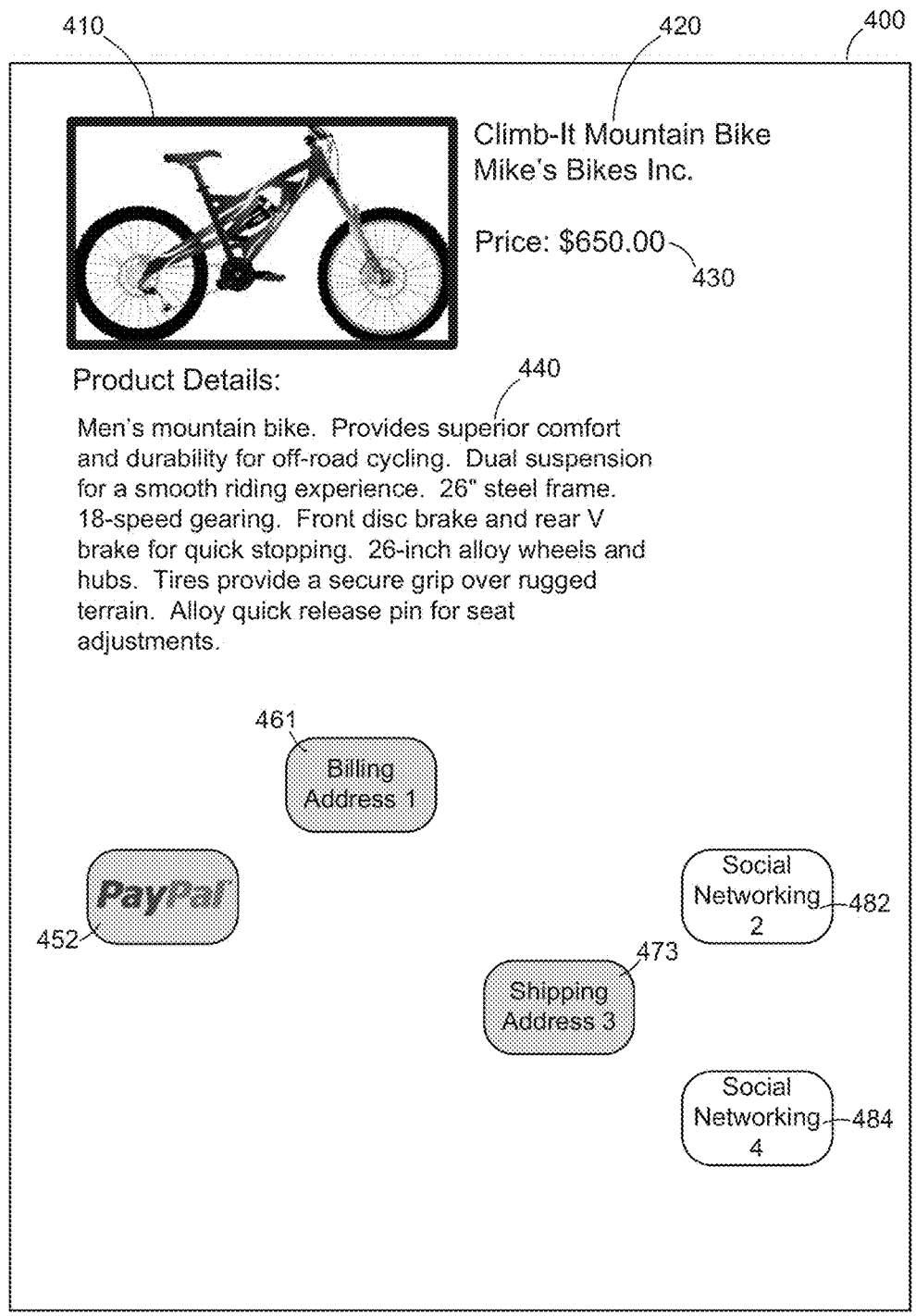

In FIG. 4D, the user may select the first selectable billing address option 461 and the third selectable shipping address option 473. The selection of the third selectable shipping address option 473 may make the first social networking option 481 and the third social networking option 483 unavailable for selection, thereby leaving only the second social networking option 482 and the fourth social networking option 484 available for selection.

In FIG. 4D, the user may select both the second social networking option 482 and the fourth social networking option 484. In some embodiments, selection of the selectable item identifier 410 or any of the selectable checkout options may result in the selection being used to populate an e-commerce shopping cart. In some embodiments, the user may be enabled to confirm the selections upon making all of the selections necessary to complete the checkout process or in response to selecting a submit button, or some other mechanism, to indicate that the user is ready to complete the checkout process.

Figure 4E:
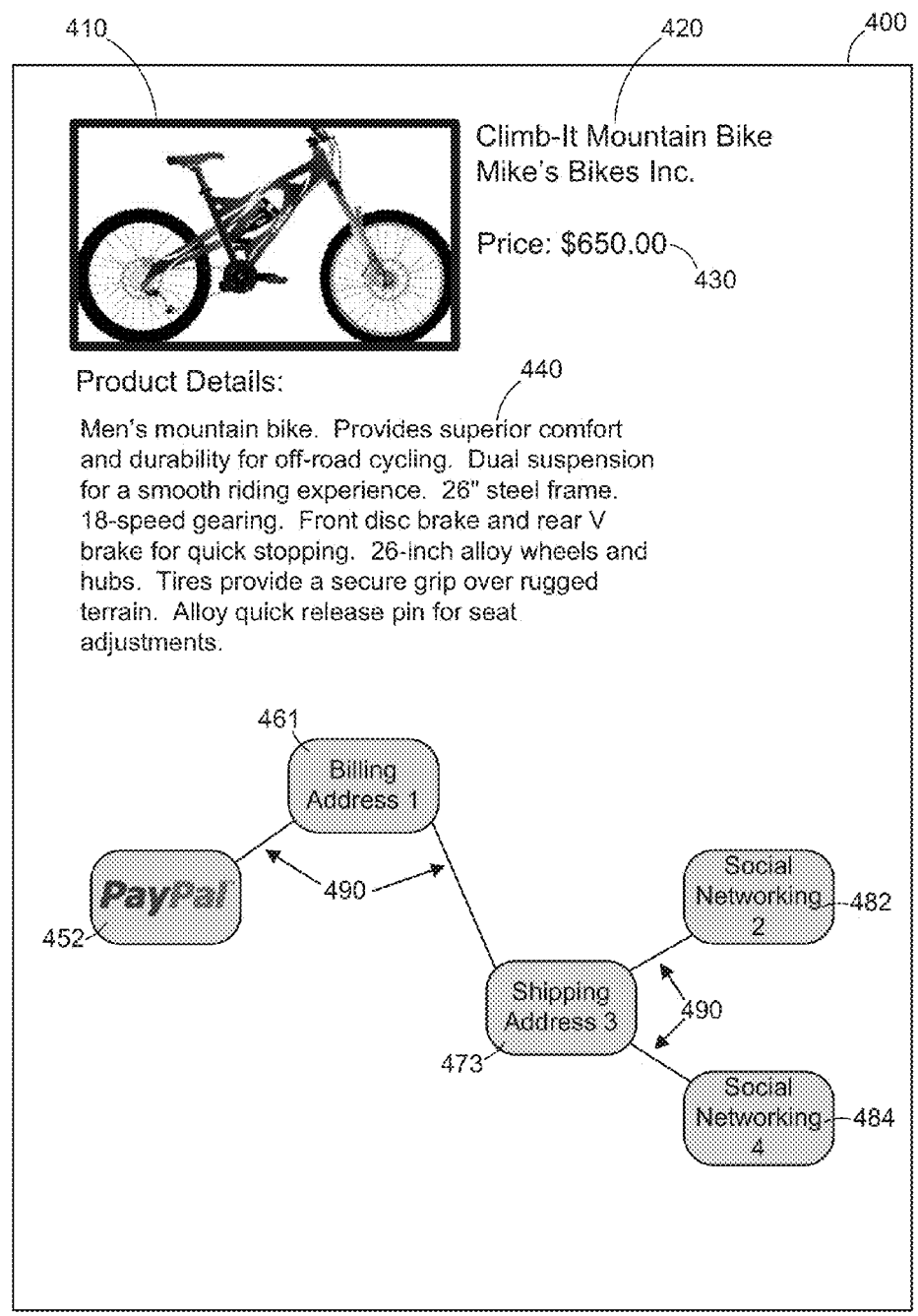

In some embodiments, the selected checkout options may be displayed as being connected. As shown in FIG. 4E, in some embodiments, the single page 400 may graphically connect the selected checkout options 452, 461, 473, 482, and 484 using lines 490. It is contemplated that other forms of displaying connections between selected checkout options are within the scope of the present disclosure.

As previously mentioned, in some embodiments, the checkout option display module 234 may reside on a client device rather than on a server that hosts the e-commerce site on which the item listing is published. In some embodiments, this client device may be a mobile device (e.g., a cell phone). However, it is contemplated that the checkout option display module 234 may reside on other types of client devices as well. Examples of other types of client devices include, but are not limited to, desktop computers. It may be useful for the checkout option display module 234 to reside on a client device in scenarios where the checkout options necessary for completing a checkout process for an item listing are ordinarily provided over multiple web pages of the checkout process (e.g., where payment instrument options are presented on one web page, billing address options are presented on another web page, and shipping address options are presented on yet another web page), but that are being viewed by a user on a client device where loading multiple pages for the checkout process may be inconvenient.

Figure 5:
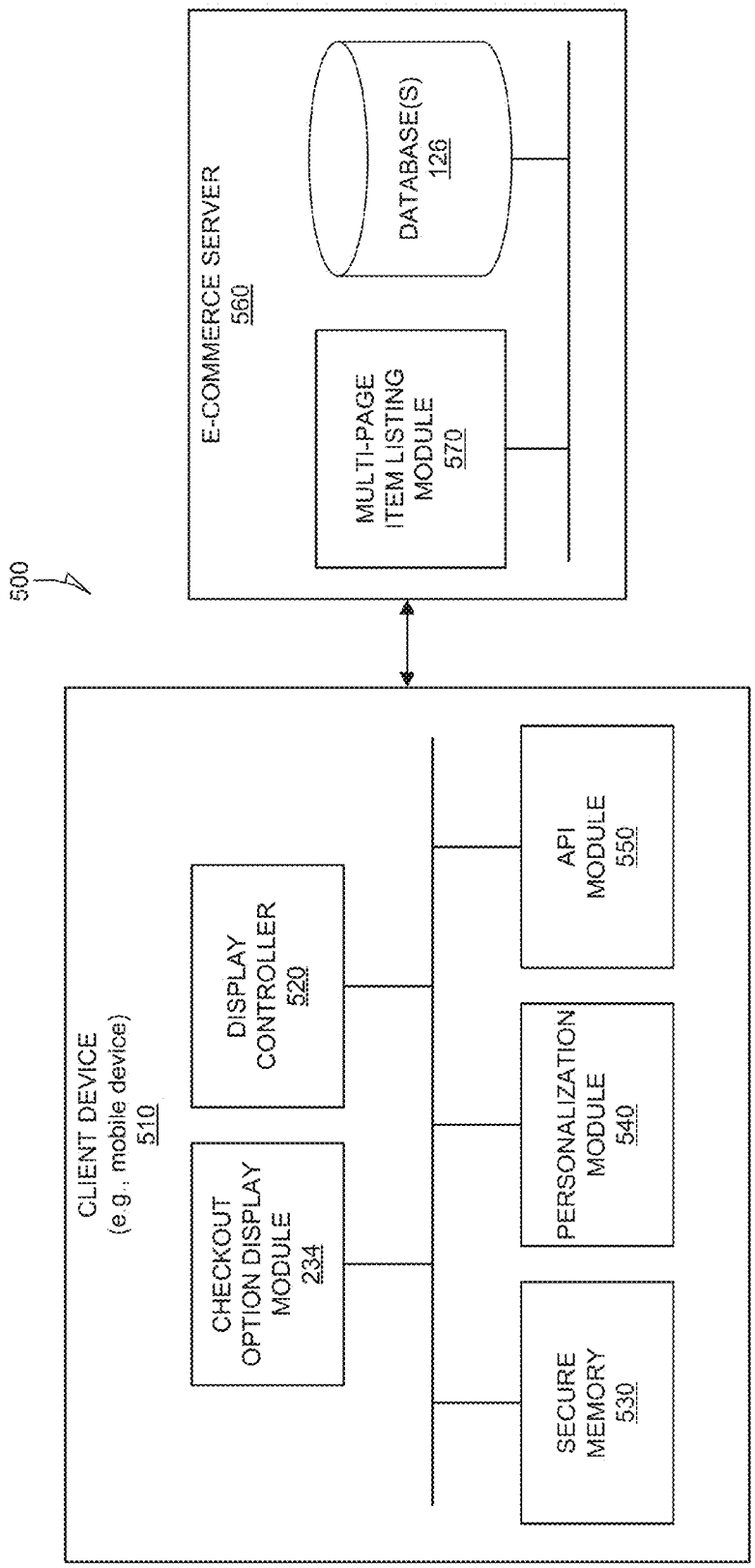
FIG. 5 illustrates an example embodiment of a system for generating a single page of selectable checkout options for an item listing or listings using checkout options presented over multiple web pages of a checkout process for the item listing.

FIG. 5 illustrates an example embodiment of a system 500 for generating a single page of selectable checkout options for an item listing using checkout options presented over multiple web pages of a checkout process for the item listing. In FIG. 5, the checkout option display module 234 may reside on a client device 510. In some embodiments, the client device 510 is a mobile device (e.g., a cell phone or tablet computer). However, it is contemplated that other types of client devices are within the scope of the present disclosure, including, but not limited to, desktop computers. In some embodiments, the client device 510 may comprise the client machine 110 or the client machine 112 of FIG. 1.

In some embodiments, an e-commerce server 560 may host an e-commerce website being accessed by the client device 510. The e-commerce website may employ a multi-page checkout process for displaying checkout options for an item listing (e.g., one page for payment instrument options, another page for billing address options, and yet another page for shipping address options). A multi-page item listing module 570 may be configured to generate each stage of the multi-page checkout process. The multi-page item listing module 570 may comprise any of the applications on the one or more application servers 118 of FIG. 1. For example, multi-page item listing module 570 may comprise any of the marketplace applications 120 and payment applications 122 of FIGS. 1 and 2. In some embodiments, the multi-page item listing module 570 may be configured to generate the stages of the multi-page checkout process using information stored in the one or more databases 126 of FIG. 1. It is contemplated that other databases may be used as well. The multi-page item listing module 570 may extract data from the one or more databases 126, which may then be used to generate the multiple pages of the checkout process. This data may include, but is not limited to, information that may be used to form the selectable item identifier (e.g., an item title or an image of an item), information that may be used to form the selectable checkout options (e.g., acceptable methods of payment), and any other information that may be presented in an item listing (e.g., an item description and an item price).

In some embodiments, the client device 510 may obtain any of the data used to generate the multiple pages of the checkout process. The checkout option display module 234 may then use this data to generate the single page of selectable checkout options (e.g., single page 300 or single page 400). In some embodiments, this multiple page data may be transmitted to the client device 510 before the checkout option display module 234 generates the single page of selectable checkout options. For example, in some embodiments where a multiple page checkout process comprises displaying an item information page (e.g., displaying item name, item description, and item price), then a payment instrument page (e.g., displaying payment instrument options), then a billing address page (displaying billing address options), and then a shipping address page (displaying shipping address options), data that is used to generate all of these separate pages may be transmitted to the client device 510, where the checkout option display module 234 may then use the data of the multiple pages to generate the single page of checkout options. In some embodiments, the data may be provided by the one or more databases 126, the multi-page item listing module 570, and/or any other component used in the presentation of the multi-page checkout process. In some embodiments, the client device 510 may use a display controller 520 to display the single page of checkout options that is generated by the checkout option display module 234.

The client device 510 may use an API module 550 to communicate with the one or more components of the e-commerce server 560 and to obtain the data that is used to generate the single page of checkout options. In some embodiments, some of the data used to generate the single page of checkout options may be obtained from one or more sources other than the e-commerce server 560. In some embodiments, some of this data may be stored on the client device 510. For example, the client device 510 may comprise a secure memory 530 to store and a personalization module 540 to configure information that may be used to generate the single page of checkout options, including, but not limited to, one or more shipping addresses, one or more shipping methods, one or more payment instruments (e.g., credit card account information, bank account information, etc.), one or more billing addresses, and the like. The checkout option display module 234 may look up this information when generating the single page of checkout options.

Although the various components of the system 500 have been disclosed in terms of a variety of individual modules and other components, a skilled artisan will recognize that many of the items can be combined or organized in other ways, and that not all components need to be present or implemented in accordance with example embodiments. The description given herein simply provides an example to aid the reader in an understanding of the systems and methods used herein.

Figure 6:
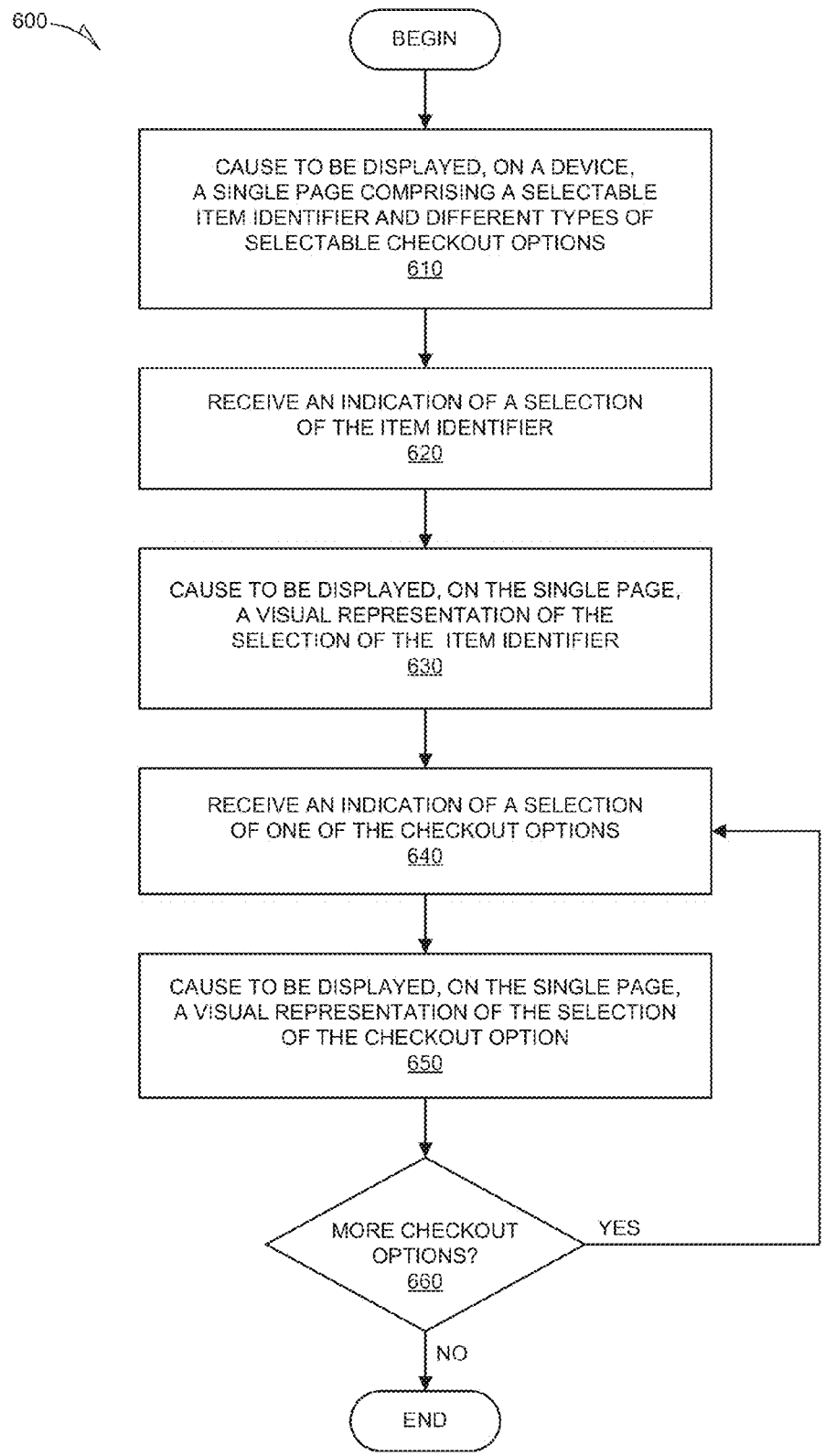
FIG. 6 is a flowchart illustrating an example method of presenting selectable checkout options on a computing device.

FIG. 6 is a flowchart illustrating an example method 600 of presenting selectable checkout options. It is contemplated that any of the operations of method 600, or combinations thereof, may be performed by one or more modules of a system (e.g., checkout option display module 234). Furthermore, the operations of method 600 may incorporate any of the other features disclosed herein. At operation 610, a single page may be caused to be displayed on a device. The single page may comprise a selectable item identifier and different types of selectable checkout options. At operation 620, an indication of a selection of the item identifier may be received. At operation 630, a visual representation of the selection of the item identifier may be caused to be displayed on the single page on the device. At operation 640, an indication of a selection of one of the checkout options may be received. At operation 650, a visual representation of the selection of the checkout option may be caused to be displayed on the single page on the device. At operation 660, a determination may be made as to whether there are any more types of checkout options that still need to be selected for completion of a checkout process. If a determination is made that there are more checkout options that still need to be selected, then the method 600 may return to operation 640, where an indication of a selection may be received. If a determination is made that there are not any more checkout options that still need to be selected, then the method 600 may end.

Figure 7:
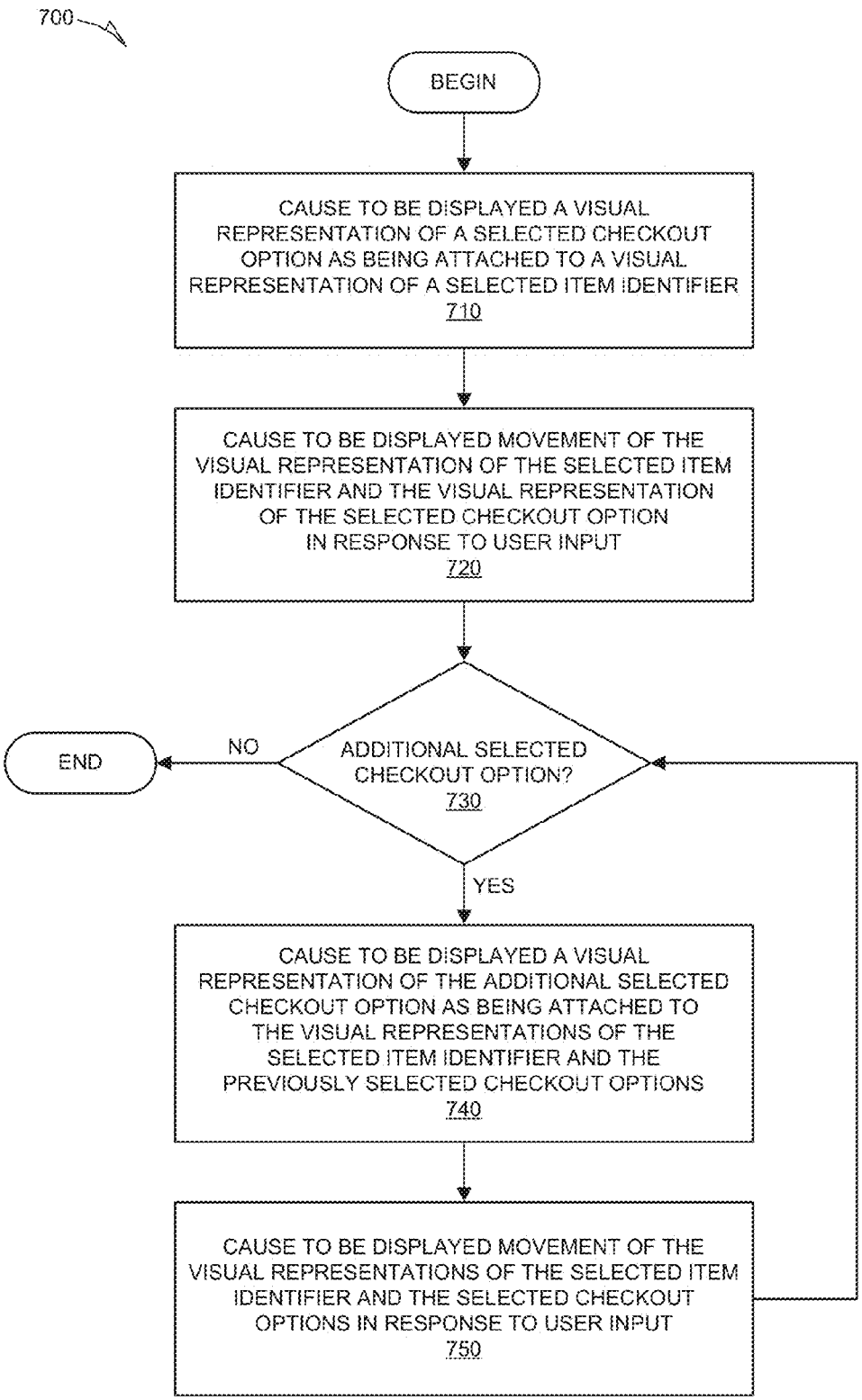
FIG. 7 is a flowchart illustrating an example method of presenting visual representations of selected checkout options on a computing device.

FIG. 7 is a flowchart illustrating an example method 700 of presenting visual representations of selected checkout options. It is contemplated that any of the operations of method 700, or combinations thereof, may be performed by one or more modules of a system (e.g., checkout option display module 234). Furthermore, the operations of method 700 may incorporate any of the other features disclosed herein. At operation 710, a visual representation of a selected checkout option may be caused to be displayed as being attached to a visual representation of a selected item identifier (e.g., visual representation 384 displayed as being attached to visual representation 382 in FIG. 3E). At operation 720, movement of the visual representation of the selected item identifier and movement of the visual representation of the selected checkout option may be caused to be displayed. In some embodiments, movement of the visual representation of the selected item identifier may be matched by a corresponding movement of the visual representation of the selected checkout option. At operation 730, a determination may be made as to whether an additional checkout option has been selected. If an additional checkout option has not been selected, then the method 700 may end. If an additional checkout option has been selected, then the method may proceed to operation 740, where a visual representation of the additional selected checkout option may be caused to be displayed as being attached to the visual representations of the item identifier and the previously-selected checkout options. At operation 750, movement of the visual representations of the selected item identifier and selected checkout options may be caused to be displayed. In some embodiments, the movement of the visual representation of the selected item identifier and the movement of the visual representations of the selected checkout options may correspond to one another. The method 700 may then return to operation 730, where a determination may once again be made as to whether an additional checkout option has been selected.

Figure 8:
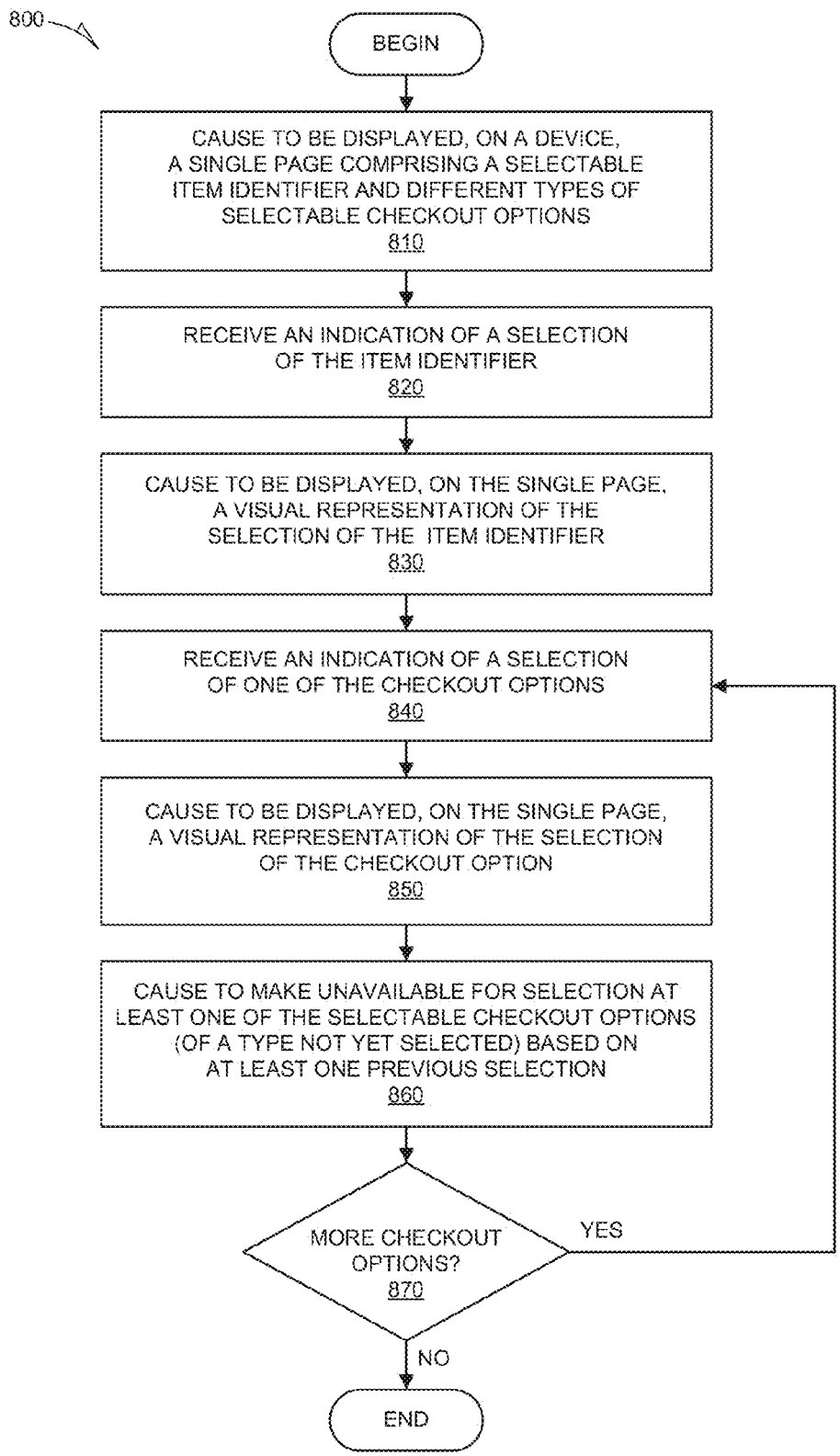
FIG. 8 is a flowchart illustrating an example method of presenting selectable checkout options on a computing device.

FIG. 8 is a flowchart illustrating an example method 800 of presenting selectable checkout options. It is contemplated that any of the operations of method 800, or combinations thereof, may be performed by one or more modules of a system (e.g., checkout option display module 234). Furthermore, the operations of method 800 may incorporate any of the other features disclosed herein. At operation 810, a single page may be caused to be displayed on a device. The single page may comprise a selectable item identifier and different types of selectable checkout options. At operation 820, an indication of a selection of the item identifier may be received. At operation 830, a visual representation of the selection of the item identifier may be caused to be displayed on the single page on the device. At operation 840, an indication of a selection of one of the checkout options may be received. At operation 850, a visual representation of the selection of the checkout option may be caused to be displayed on the single page on the device. At operation 860, at least one of the selectable checkout options, of a type not yet selected, may be caused to be made unavailable for selection based on at least one previous selection of a checkout option. For example, a selection of a payment instrument option (e.g., PayPal) may result in a billing address option that was previously available for selection being made to be no longer available for selection. At operation 870, a determination may be made as to whether there are any more types of checkout options that still need to be selected for completion of a checkout process. If a determination is made that there are more checkout options that still need to be selected, then the method 800 may return to operation 840, where an indication of a selection may be received. If a determination is made that there are not any more checkout options that still need to be selected, then the method 800 may end.

Figure 9:
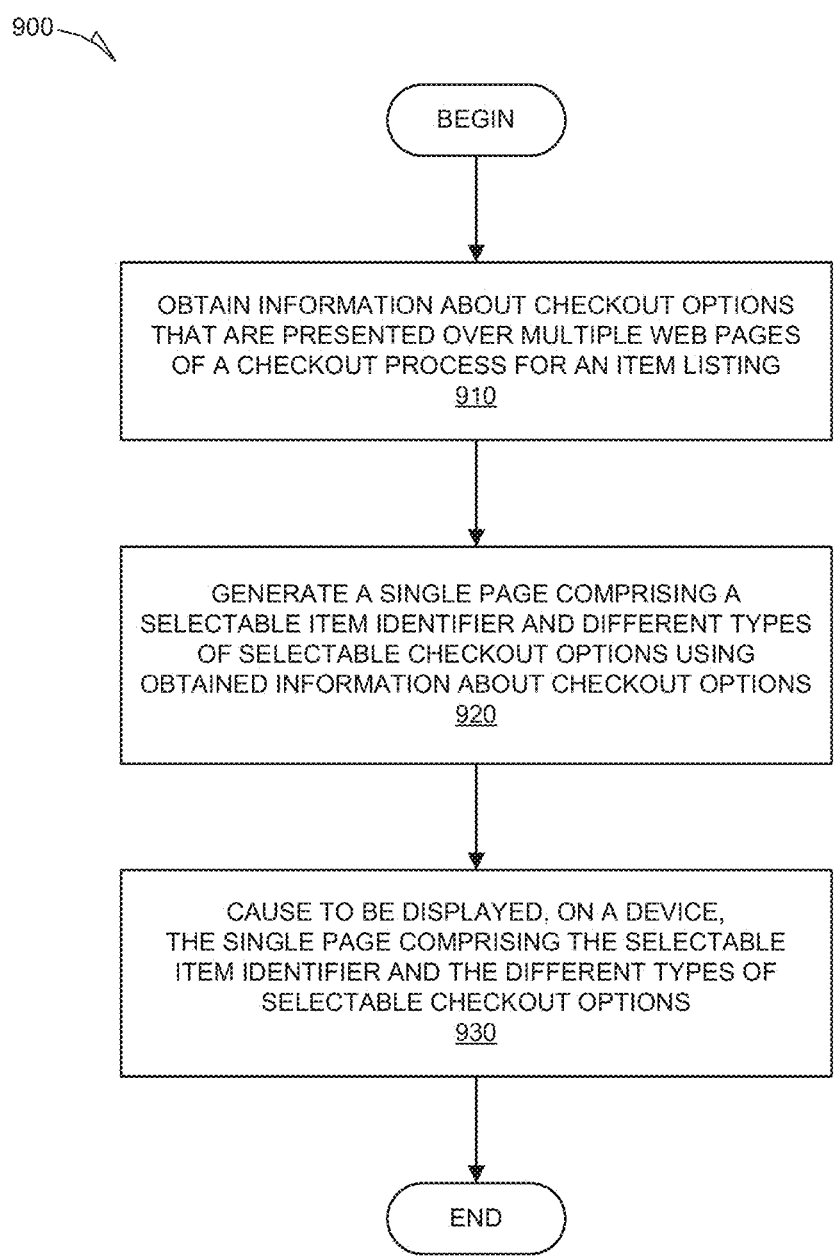
FIG. 9 is a flowchart illustrating an example method of generating a single page of a selectable item identifier and different types of selectable checkout options to be displayed on a single page on a computing device.

FIG. 9 is a flowchart illustrating an example method 900 of generating a single page of a selectable item identifier and different types of selectable checkout options to be displayed on a single page. It is contemplated that any of the operations of method 900, or combinations thereof, may be performed by one or more modules of a system (e.g., checkout option display module 234). Furthermore, the operations of method 900 may incorporate any of the other features disclosed herein. At operation 910, information about checkout options that are presented over multiple web pages of a checkout process for an item listing may be obtained (e.g., received via data transmission). At operation 920, a single page may be generated using the obtained information about the checkout options. The single page may comprise a selectable item identifier and different types of selectable checkout options. At operation 930, the single page comprising the selectable item identifier and the different types of selectable checkout options may be caused to be displayed on a device.

In some embodiments, the networked system provides information to the device, enabling presentation of transaction information on a single page, such as illustrated in FIGS. 3A-3H and so forth. The information communicated from the networked system, such as system 102 of FIG. 1, provides option information, visual representation instructions and processing order. This information is stored for use in presenting transaction information to the user, as well as for use in interacting with the user. As a user browses or searches for a specific item or type of item, the networked system searches the inventory database(s) and transmits the item information and visual representation instructions to the device. The device receives this information and applies it to the stored information for visual representations, processing, and so forth. In this way, communications between the networked system and the user device are minimized, providing efficient transactions, increasing the speed of transaction, and reducing processing latency in completion of a transaction. Additionally, reducing communications between the user device and networked server reduces the risk of a third party intercepting information by providing less opportunity for access to user information.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
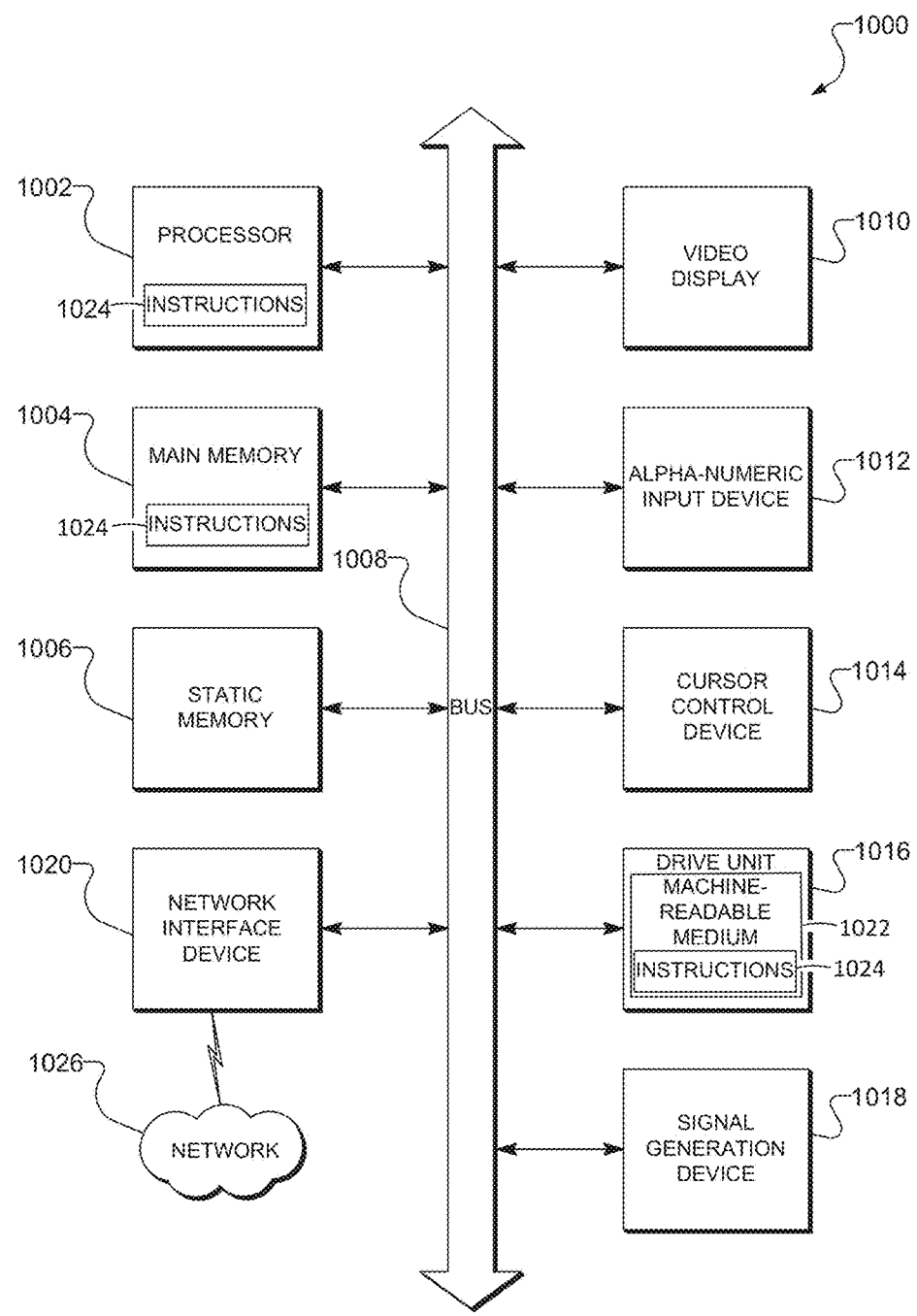
FIG. 10 shows a diagrammatic representation of a machine in the example form of a computer system within which a set of instructions may be executed to cause the machine to perform any one or more of the methodologies discussed herein.

FIG. 10 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    at least one processor; and
    a checkout option display module, executable by the at least one processor, configured to:
        cause to be displayed, on a device, a single page for an item listing, the single page comprising a selectable item identifier for enabling a user to select an item for purchase from the item listing and a plurality of selectable checkout options for the item, the plurality of selectable checkout options comprising different types of selectable checkout options, the selectable checkout options for the item comprising at least one selectable payment instrument option;
        receive an indication of a selection of the item identifier and an indication of a selection of one of the selectable checkout options, the selection of the item identifier being indicated by an interaction with the item identifier by the user, and the selection of the one of the selectable checkout options being indicated by an interaction with the one of the selectable checkout options by the user;
        cause to be displayed, on the single page, a visual representation of the selection of the selectable item identifier and a visual representation of the selection of one of the selectable checkout options;
        cause to be displayed, on the single web page, movement of the visual representation of the selection of the selectable item identifier and movement of the visual representation of the selection of one of the selectable checkout options in response to user input; and
        cause a visual representation for each of the selectable checkout options that are selected to be displayed on the single page and to be displayed as being attached to the visual representation of the selection of the selectable item identifier, the visual representation of the selectable item identifier and the visual representation of the one of the selectable checkout options being separate representations from the item identifier and the one of the selectable checkout options, movement of the visual representation of the selection of the selectable item identifier along a path on the single page being matched by a corresponding movement of the visual representation for each of the selectable checkout options that are selected, the corresponding movement of the visual representations for each of the selectable checkout options that are selected being along the same path on the single page as the movement of the visual representation of the selection of the selectable item identifier,
        wherein the visual representation of the selection of the selectable item identifier comprises an icon of the selected item identifier which is displayed upon the user selecting the item for purchase from the item listing and the visual representation of the selection of one of the selectable checkout options comprises an icon of the selected checkout option such that upon selection of the selectable item identifier, the icon of the selected item identifier moves along the path on the single page and upon selection of the selected checkout option, the icon of the selected checkout option is attached adjacent to the icon of the selected item identifier and moves along the path on the single page.

2. The system of claim 1, wherein the selectable checkout options for the item further comprise at least one selectable billing address option and at least one selectable shipping address option.

3. The system of claim 1, wherein the checkout option display module is further configured to cause at least one of the selectable checkout options to be unavailable for selection in response to a different one of the selectable checkout options being selected, the different one of the selectable checkout options being of a different type than the at least one of the selectable checkout options being caused to be unavailable for selection.

4. The system of claim 1, wherein the checkout option display module is further configured to generate the single page using checkout options presented over multiple web pages of a checkout process for an item listing, each one of the checkout options presented over the multiple web pages being used to generate a corresponding one of the selectable checkout options.

5. A computer-implemented method comprising:
    causing to be displayed, on a device, a single page for an item listing, the single page comprising a selectable item identifier for enabling a user to select an item for purchase from the item listing and a plurality of selectable checkout options for the item, the plurality of selectable checkout options comprising different types of selectable checkout options, the selectable checkout options for the item comprising at least one selectable payment instrument option;
    receiving an indication of a selection of the item identifier and an indication of a selection of one of the selectable checkout options, the selection of the item identifier being indicated by an interaction with the item identifier by the user, and the selection of the one of the selectable checkout options being indicated by an interaction with the one of the selectable checkout options by the user;
    causing to be displayed, on the single page, a visual representation of the selection of the selectable item identifier and a visual representation of the selection of one of the selectable checkout options;
    causing to be displayed, on the single page, movement of the visual representation of the selection of the selectable item identifier and movement of the visual representation of the selection of one of the selectable checkout options in response to user input; and causing a visual representation for each of the selectable checkout options that are selected to be displayed on the single page and to be displayed as being attached to the visual representation of the selection of the selectable item identifier, the visual representation of the selectable item identifier and the visual representation of the one of the selectable checkout options being separate representations from the item identifier and the one of the selectable checkout options, movement of the visual representation of the selection of the selectable item identifier along a path on the single page being matched by a corresponding movement of the visual representation for each of the selectable checkout options that are selected, the corresponding movement of the visual representations for each of the selectable checkout options that are selected being along the same path on the single page as the movement of the visual representation of the selection of the selectable item identifier, wherein the visual representation of the selection of the selectable item identifier comprises an icon of the selected item identifier which is displayed upon the user selecting the item for purchase from the item listing and the visual representation of the selection of one of the selectable checkout options comprises an icon of the selected checkout option such that upon selection of the selectable item identifier, the icon of the selected item identifier moves along the path on the single page and upon selection of the selected checkout option, the icon of the selected checkout option is attached adjacent to the icon of the selected item identifier and moves along the path on the single page.

6. The method of claim 5, wherein the selectable checkout options for the item further comprise at least one selectable billing address option and at least one selectable shipping address option.

7. The method of claim 5, further comprising causing at least one of the selectable checkout options to be unavailable for selection in response to a different one of the selectable checkout options being selected, the different one of the selectable checkout options being of a different type than the at least one of the selectable checkout options being caused to be unavailable for selection.

8. The method of claim 5, further comprising generating the single page using checkout options presented over multiple web pages of a checkout process for an item listing, each one of the checkout options presented over the multiple web pages being used to generate a corresponding one of the selectable checkout options.

9. A non-transitory machine-readable storage device storing a set of instructions that, when executed by at least one processor, causes the at least one processor to perform operations comprising:

causing to be displayed, on a device, a single page for an item listing, the single page comprising a selectable item identifier for enabling a user to select an item for purchase from the item listing and a plurality of selectable checkout options for the item, the plurality of selectable checkout options comprising different types of selectable checkout options, the selectable checkout options for the item comprising at least one selectable payment instrument option;

receiving an indication of a selection of the item identifier and an indication of a selection of one of the selectable checkout options, the selection of the item identifier being indicated by an interaction with the item identifier by the user, and the selection of the one of the selectable checkout options being indicated by an interaction with the one of the selectable checkout options by the user;

causing to be displayed, on the single page, a visual representation of the selection of the selectable item identifier and a visual representation of the selection of one of the selectable checkout options;

causing to be displayed, on the single page, movement of the visual representation of the selection of the selectable item identifier and movement of the visual representation of the selection of one of the selectable checkout options in response to user input; and causing a visual representation for each of the selectable checkout options that are selected to be displayed on the single page and to be displayed as being attached to the visual representation of the selection of the selectable item identifier, the visual representation of the selectable item identifier and the visual representation of the one of the selectable checkout options being separate representations from the item identifier and the one of the selectable checkout options, movement of the visual representation of the selection of the selectable item identifier along a path on a single page being matched by a corresponding movement of the visual representation for each of the selectable checkout options that are selected, the corresponding movement of the visual representations for each of the selectable checkout options that are selected being along the same path on the single page as the movement of the visual representation of the selection of the selectable item identifier, wherein the visual representation of the selection of the selectable item identifier comprises an icon of the selected item identifier which is displayed upon the user selecting the item for purchase from the item listing and the visual representation of the selection of one of the selectable checkout options comprises an icon of the selected checkout option such that upon selection of the selectable item identifier, the icon of the selected item identifier moves along the path on the single page and upon selection of the selected checkout option, the icon of the selected checkout option is attached adjacent to the icon of the selected item identifier and moves along the path on the single page.

10. The device of claim 9, wherein the selectable checkout options for the item further comprise at least one selectable billing address option and at least one selectable shipping address option.

11. The device of claim 9, wherein the operations further comprise causing at least one of the selectable checkout options to be unavailable for selection in response to a different one of the selectable checkout options being selected, the different one of the selectable checkout options being of a different type than the at least one of the selectable checkout options being caused to be unavailable for selection.

12. The device of claim 9, wherein the operations further comprise generating the single page using checkout options presented over multiple web pages of a checkout process for an item listing, each one of the checkout options presented over the multiple web pages being used to generate a corresponding one of the selectable checkout options.

* * * * *